US007920892B2

(12) United States Patent
Matsubara

(10) Patent No.: US 7,920,892 B2
(45) Date of Patent: Apr. 5, 2011

(54) RECEIVING DEVICE, REBROADCAST CONTENT SCHEDULING DEVICE, RECEPTION STATE NOTIFYING METHOD, REBROADCAST CONTENT SCHEDULING METHOD, REBROADCAST CONTENT SCHEDULING SYSTEM, REBROADCAST CONTENT SCHEDULING PROGRAM, AND RECORDING MEDIUM

(75) Inventor: Go Matsubara, Chiba (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 370 days.

(21) Appl. No.: 12/249,756

(22) Filed: Oct. 10, 2008

(65) Prior Publication Data

US 2009/0106795 A1 Apr. 23, 2009

Related U.S. Application Data

(62) Division of application No. 11/233,068, filed on Sep. 23, 2005, now Pat. No. 7,574,231.

(60) Provisional application No. 60/714,901, filed on Sep. 8, 2005.

(30) Foreign Application Priority Data

Sep. 7, 2005 (JP) ................................ 2005-259943

(51) Int. Cl.
*H04M 1/00* (2006.01)

(52) U.S. Cl. .................. 455/550.1; 455/414.3; 455/418; 725/44; 709/21

(58) Field of Classification Search ............... 455/414.1, 455/414.3, 418, 550.1; 725/22, 44; 709/21
See application file for complete search history.

(56) References Cited

U.S. PATENT DOCUMENTS

| | | | | |
|---|---|---|---|---|
| 5,701,580 A | 12/1997 | Yamane et al. | | |
| 6,404,739 B1 | 6/2002 | Gonno et al. | | |
| 6,732,313 B2 | 5/2004 | Fukushima et al. | | |
| 7,024,156 B2 * | 4/2006 | Kawamata et al. | .......... | 455/3.02 |
| 7,260,356 B2 * | 8/2007 | Helstrom et al. | ............ | 455/3.02 |
| 7,260,601 B1 * | 8/2007 | Day et al. | ...................... | 709/203 |
| 7,363,001 B2 * | 4/2008 | Steelberg et al. | ............ | 455/3.06 |
| 7,646,762 B2 * | 1/2010 | Cai et al. | ....................... | 370/352 |
| 2002/0052952 A1 | 5/2002 | Yoshida et al. | | |
| 2002/0054570 A1 | 5/2002 | Takeda | | |
| 2003/0149988 A1 | 8/2003 | Ellis et al. | | |
| 2005/0053093 A1 | 3/2005 | Fukushima et al. | | |
| 2005/0229213 A1 | 10/2005 | Ellis et al. | | |
| 2005/0283810 A1 | 12/2005 | Ellis et al. | | |
| 2006/0010208 A1 | 1/2006 | Fujisawa et al. | | |

FOREIGN PATENT DOCUMENTS

| | | |
|---|---|---|
| JP | 08-213961 | 8/1996 |
| JP | 10-257001 | 9/1998 |
| JP | 11-017737 | 1/1999 |
| JP | 11-164294 A | 6/1999 |

(Continued)

*Primary Examiner* — Nhan Le
(74) *Attorney, Agent, or Firm* — Birch, Stewart, Kolasch & Birch, LLP

(57) ABSTRACT

A rebroadcast content scheduling device receives reception state information and schedules rebroadcast content, where the reception state information includes content identification information for identifying content represented by the broadcast wave received by the receiving section and indicates that the reception defection occurred in the reception of the content. Thus, the rebroadcast content scheduling device can determine to rebroadcast, as the rebroadcast content, the content that was received with many reception defections.

17 Claims, 23 Drawing Sheets

FOREIGN PATENT DOCUMENTS

| | | | |
|---|---|---|---|
| JP | 11-205771 | A | 7/1999 |
| JP | 2001-177818 | A | 6/2001 |
| JP | 2001-292114 | A | 10/2001 |
| JP | 2002-84438 | A | 3/2002 |
| JP | 2002-290357 | A | 10/2002 |
| JP | 3093538 | U | 2/2003 |
| JP | 2003-125380 | A | 4/2003 |
| JP | 2003-169310 | A | 6/2003 |
| JP | 2003-199026 | | 7/2003 |
| JP | 2003-520458 | A | 7/2003 |
| JP | 2004-200881 | A | 7/2004 |
| JP | 2004-200882 | A | 7/2004 |

* cited by examiner

FIG. 4

| | Ch1 | Ch2 | Ch0(FOR REBROADCAST) |
|---|---|---|---|
| 07:00-08:00 | WEATHER NEWS | SAMURAI STORY | |
| 08:00-09:00 | GOOD MORNING NEWS | | |
| 09:00-10:00 | TABLOID X | ... | |
| ⋮ | ⋮ | ⋮ | |
| 12:00-13:00 | NEWS AT NOON | FRIEND OF HOUSEWIVES | |
| ⋮ | ⋮ | ⋮ | |
| 16:00-17:00 | LIVE BROADCAST OF PARLIAMENTARY PROCEEDINGS | ABC DRAMA | |
| ⋮ | ⋮ | ⋮ | |

FIG. 5

| CHANNEL INFO | RECEPTION DEFECTION OCCURRENCE TIME |
|---|---|
| Ch1 | 2005/8/14 08:21:20 |
| ⋮ | ⋮ |

FIG. 6

| BROADCAST AREA INFO | COVERAGE AREA INFO |
|---|---|
| BROADCAST AREA A | CENTER POINT : LAT 43.5、LNG 135.2<br>RADIUS : 40km |
| ⋮ | ⋮ |

FIG. 7

| | MAIL ADDRESS | BROADCAST AREA INFO | CONTENT NAME | PACKET LOSS RATIO |
|---|---|---|---|---|
| No.1 | aaa@hoge.com | BROADCAST AREA A | GOOD MORNING NEWS | 12 |
| ⋮ | ⋮ | ⋮ | ⋮ | ⋮ |

FIG. 8

BROADCAST AREA A

| CONTENT NAME | CONTENT LENGTH | REBROADCAST SCHEDULABLE TIME | DEFECTION COUNT |
|---|---|---|---|
| GOOD MORNING NEWS | 1h | 12:00 OR LATER | 30 |
| SAMURAI STORY | 2h | 12:00 OR LATER | 20 |
| TABLOID X | 1h | 13:00 OR LATER | 10 |
| ⋮ | ⋮ | ⋮ | ⋮ |

BROADCAST AREA B

| CONTENT NAME | CONTENT LENGTH | REBROADCAST SCHEDULABLE TIME | DEFECTION COUNT |
|---|---|---|---|
| GOOD MORNING NEWS | 1h | 12:00 OR LATER | 130 |
| SAMURAI STORY | 2h | 12:00 OR LATER | 6 |
| ⋮ | ⋮ | ⋮ | ⋮ |

BROADCAST AREA C

| CONTENT NAME | CONTENT LENGTH | REBROADCAST SCHEDULABLE TIME | DEFECTION COUNT |
|---|---|---|---|
| GOOD MORNING NEWS | 1h | 12:00 OR LATER | 90 |
| SAMURAI STORY | 2h | 12:00 OR LATER | 9 |
| TABLOID X | 1h | 13:00 OR LATER | 30 |
| ⋮ | ⋮ | ⋮ | ⋮ |

FIG. 10

To: TV@foo.com
From: aaa@hoge.com
Subject: RECEPTION FAILURE NOTICE
Date: 2005/08/14 08:21:20

---

Lat=42.5
Lon=135.9
Channel=1
Level=12

FIG. 13

From: TV@foo.com
To: aaa@hoge.com
Subject: REBROADCAST NOTICE
Date: 2005/08/14 11:05:00

---

THIS IS TO NOTIFY YOU THAT
“GOOD MORNINGS NEWS” YOU WATCHED
WILL BE REBROADCASTED
FROM 12:00 AT CH 0 FOR YOU TO WATCH.

FIG. 16

ALL BROADCAST AREA

| | Ch1 | Ch2 | Ch0(FOR REBROADCAST) |
|---|---|---|---|
| 07:00-08:00 | WEATHER NEWS | SAMURAI STORY | |
| 08:00-09:00 | GOOD MORNING NEWS | | |
| ⋮ | ⋮ | ⋮ | |
| 12:00-13:00 | NEWS AT NOON | FRIEND OF HOUSEWIVES | GOOD MORNING NEWS |
| ⋮ | ⋮ | ⋮ | |

FIG. 17

BROADCAST AREA A

| CONTENT NAME | CONTENT LENGTH | REBROADCAST SCHEDULABLE TIME | DEFECTION COUNT |
|---|---|---|---|
| SAMURAI STORY | 2h | 12:00 OR LATER | 20 |
| TABLOID X | 1h | 13:00 OR LATER | 10 |
| ⋮ | ⋮ | ⋮ | ⋮ |

⋮

BROADCAST AREA C

| CONTENT NAME | CONTENT LENGTH | REBROADCAST SCHEDULABLE TIME | DEFECTION COUNT |
|---|---|---|---|
| SAMURAI STORY | 2h | 12:00 OR LATER | 9 |
| TABLOID X | 1h | 13:00 OR LATER | 30 |
| ⋮ | ⋮ | ⋮ | ⋮ |

FIG. 18

BROADCAST AREA A

| | Ch1 | Ch2 | Ch0(FOR REBROADCAST) |
|---|---|---|---|
| 07:00-08:00 | WEATHER NEWS | SAMURAI STORY | |
| 08:00-09:00 | GOOD MORNING NEWS | | |
| 09:00-10:00 | TABLOID X | ... | |
| ⋮ | ⋮ | ⋮ | |
| 12:00-13:00 | NEWS AT NOON | FRIEND OF HOUSEWIVES | GOOD MORNING NEWS |
| 13:00-14:00 | | | SAMURAI STORY |
| 14:00-15:00 | | | |
| ⋮ | ⋮ | ⋮ | |

FIG. 19

BROADCAST AREA C

| | Ch1 | Ch2 | Ch0(FOR REBROADCAST) |
|---|---|---|---|
| 07:00-08:00 | WEATHER NEWS | SAMURAI STORY | |
| 08:00-09:00 | GOOD MORNING NEWS | | |
| 09:00-10:00 | TABLOID X | ... | |
| ⋮ | ⋮ | ⋮ | |
| 12:00-13:00 | NEWS AT NOON | FRIEND OF HOUSEWIVES | GOOD MORNING NEWS |
| 13:00-14:00 | | | TABLOID X |
| ⋮ | ⋮ | ⋮ | |

FIG. 20

AREA INFO:BROADCAST AREAC

| CONTENT NAME | CONTENT LENGTH | REBROADCAST SCHEDULABLE TIME | DEFECTION COUNT |
|---|---|---|---|
| FRIEND OF HOUSEWIVES | 1h | 16:00 OR LATER | 2200 |
| NEWS AT NOON | 1h | 16:00 OR LATER | 1200 |
| SAMURAI STORY | 2h | 12:00 OR LATER | 9 |
| ⋮ | ⋮ | ⋮ | ⋮ |

FIG. 21

BROADCAST AREA C

| | Ch1 | Ch2 | Ch0(FOR REBROADCAST) |
|---|---|---|---|
| 07:00-08:00 | WEATHER NEWS | SAMURAI STORY | |
| 08:00-09:00 | GOOD MORNING NEWS | | |
| 09:00-10:00 | TABLOID X | ... | |
| ⋮ | ⋮ | ⋮ | |
| 12:00-13:00 | NEWS AT NOON | FRIEND OF HOUSEWIVES | GOOD MORNING NEWS |
| ⋮ | ⋮ | ⋮ | |
| 16:00-17:00 | LIVE BROADCAST OF PARLIAMENTARY PROCEEDINGS | ABC DRAMA | FRIEND OF HOUSEWIVES |
| ⋮ | ⋮ | ⋮ | |

FIG. 23

BROADCAST AREA C

| | Ch1 | Ch2 | Ch0(FOR REBROADCAST) |
|---|---|---|---|
| 07:00-08:00 | WEATHER NEWS | SAMURAI STORY | |
| 08:00-09:00 | GOOD MORNING NEWS | | |
| 09:00-10:00 | TABLOID X | ... | |
| ⋮ | ⋮ | ⋮ | |
| 12:00-13:00 | NEWS AT NOON | FRIEND OF HOUSEWIVES | GOOD MORNING NEWS |
| ⋮ | ⋮ | ⋮ | |
| 16:00-17:00 | LIVE BROADCAST OF PARLIAMENTARY PROCEEDINGS | ABC DRAMA | FRIEND OF HOUSEWIVES |
| ⋮ | ⋮ | ⋮ | |

FIG. 24

| BROADCAST TIME | Ch1 |
|---|---|
| 06:00-07:00 | EARLY RISERS JAPAN |
| 07:00-08:00 | WEATHER NEWS |
| 08:00-09:00 | GOOD MORNING NEWS |
| 09:00-10:00 | JAPAN' S ECONOMY |
| 10:00-11:00 | |
| 11:00-12:00 | TODAY' S MENU |
| 12:00-13:00 | NEWS AT NOON |
| ⋮ | |
| 23:00-24:00 | WHAT HAPPENED TODAY |
| 24:00-01:00 | CLASSICAL MUSIC |
| 01:00-02:00 | |
| 02:00-03:00 | |
| 03:00-04:00 | |
| 04:00-05:00 | |
| 05:00-06:00 | |

REBROADCAST PERIOD (02:00-06:00)

FIG. 25

BROADCAST AREA A

| CONTENT NAME | CONTENT LENGTH | DEFECTION COUNT |
|---|---|---|
| EARLY RISERS JAPAN | 1h | 5 |
| WEATHER NEWS | 1h | 8 |
| GOOD MORNING NEWS | 1h | 30 |
| SAMURAI STORY | 2h | 20 |
| TABLOID | 1h | 10 |
| ⋮ | ⋮ | ⋮ |
| WHAT HAPPENED TODAY | 1h | 19 |

FIG. 26

| BROADCAST TIME | Ch1 |
|---|---|
| 02:00-03:00 | GOOD MORNING NEWS |
| 03:00-04:00 | SAMURAI STORY |
| 04:00-05:00 | |
| 05:00-06:00 | WHAT HAPPENED TODAY |

| | MAIL ADDRESS | BROADCAST AREA INFO | BROADCAST TIME | CHANNEL | PACKET LOSS RATIO |
|---|---|---|---|---|---|
| No.1 | aaa@hoge.com | BROADCAST AREA A | 8:20 | Ch1 | 7 |
| ⋮ | ⋮ | ⋮ | ⋮ | ⋮ | ⋮ |

REBROADCAST SCHEDULE FOR CH 1

| | TIME OF REGULAR BROADCAST |
|---|---|
| 02:00-02:10 | 12:00-12:10 |
| 02:10-02:20 | 12:10-12:20 |
| ⋮ | ⋮ |

RECEIVING DEVICE, REBROADCAST CONTENT SCHEDULING DEVICE, RECEPTION STATE NOTIFYING METHOD, REBROADCAST CONTENT SCHEDULING METHOD, REBROADCAST CONTENT SCHEDULING SYSTEM, REBROADCAST CONTENT SCHEDULING PROGRAM, AND RECORDING MEDIUM

This application is a Divisional of co-pending application Ser. No. 11/233,068 filed on Sep. 23, 2005 now U.S. Pat. No. 7,574,231, which is a nonprovisional application claiming the benefit of U.S. Provisional Application No. 60/714,901, filed on Sep. 8, 2005, and claims priority under 35 U.S.C. §119(*a*) on Patent Application No. 2005-259943 filed in Japan on Sep. 7, 2005, the entire contents of all of which are hereby incorporated by reference.

FIELD OF THE INVENTION

The present invention relates to (a) rebroadcast content scheduling system for scheduling rebroadcast content, (b) a receiving device and a rebroadcast content scheduling device, which constitute the system, (c) a piece of rebroadcast content scheduling program, and (d) a recording medium.

BACKGROUND OF THE INVENTION

Recently, mobile terminals such as onboard terminals, portable telephones, and the like have been improved significantly, so that for example, some mobile terminals are capable of functioning as audio-visual apparatuses for television broadcast.

Unlike terminals used in fixed positions, such a mobile terminal receives an electronic wave changeable in strength depending on where the mobile terminal is carried and depending on how fast the mobile terminal is carried. Therefore, such a mobile terminal has a problem in that it cannot receive the television broadcast normally sometimes (i.e., reception defection sometimes occurs in such a mobile terminal).

In view of this, for example, Japanese Patent Application Publication, *Tokukai*, No. 2002-290357 (published on Oct. 4, 2002) discloses an art in which when missing of a data frame is detected at a mobile terminal, the mobile terminal transmits, to a broadcasting content delivering server, a retransmission request signal for requesting retransmission of the missing data frame.

However, the art of Japanese Patent Application Publication, *Tokukai*, No. 2002-290357 (published on Oct. 4, 2002) is such that if the mobile terminal is not in a service area of an access point or if the mobile terminal does not receive the missing data frame within a certain period, the data frames are reproduced with some of the data frames missing, thereby preventing the user from watching/listening to the television broadcast normally.

In such a case, the user may request for rebroadcast of the content. For example, in Japanese Patent Application Publications, *Tokukai*, Nos. 2002-84438 (published on Mar. 22, 2002), 2003-125380 (published on Apr. 25, 2003), 2001-177818, (published on Jun. 29, 2001), and 2001-292114 (published on Oct. 19, 2001), arts are disclosed are in which a user operates a terminal device thereby to transmits a request that designates content which the user requests to be rebroadcasted.

Further, Japanese Patent Application Publication, *Tokukai*, Nos. 2002-84438 (published on Mar. 22, 2002), and 2003-125380 (published on Apr. 25, 2003) discloses arts in which a television program managing company or content scheduling staff decides which content is to be rebroadcasted and a broadcast time for the content to be rebroadcasted, referring to requests of users. Moreover, Japanese Patent Application Publication, *Tokukai*, No. 2001-292114 (published on Oct. 19, 2001) discloses an art in which a broadcast station decides whether a piece of rebroadcast content is to be delivered via a broadcast wave or via the Internet network, depending of a number of requests for performing rebroadcast of the rebroadcast content.

Furthermore, Japanese Patent Application Publication, *Tokukai*, Nos. 2004-200881 (published on Jul. 15, 2004) and 2004-200882 (published on Jul. 15, 2004) discloses arts in which a server searches for content that is designated by a user, and then transmits the thus searched-out content (rebroadcast content) to a recording device of the user.

Moreover, Japanese Patent Application Publication, *Tokukaihei*, No. 11-164294 (published on Jun. 18, 1999) discloses an art in which a receiving device for a pay broadcast is configured to measure reception quality and sends, to a broadcast station, information that indicates a result of the measurement, for the purpose of adjusting payment amount for the pay broadcast.

In these conventional arrangements, the user should operate the terminal device to transmit the request for rebroadcast.

In this case, users transmits the request at different times. For example, some user transmits the request within a broadcast time, while some user transmits the request a few days later. Because of this, it takes a significant time to sum up the requests for rebroadcast. As a result, long after the broadcast of the content, the rebroadcast of the content is performed. The user(s) would possibly loss an interest in the content by the time when the rebroadcast is performed.

SUMMARY OF THE INVENTION

An object of the present invention is to realize a receiving device, rebroadcast content scheduling device, rebroadcast content scheduling system, rebroadcast content scheduling program, and recording medium, which make it possible to promptly determine which content is to be rebroadcasted, according to situations of entire viewers/listeners and which do not require the viewers/listeners to perform tedious operation for rebroadcasting.

In order to attain the object, a receiving device according to the present invention is provided with: a receiving section for receiving a broadcast wave; a detection section for detecting a reception defection degree in the reception of the broadcast wave; and a reception state notifying section for transmitting reception state information to a rebroadcast content scheduling device if the reception defection degree detected by the detection section is larger than a predetermined value, the rebroadcast content scheduling device being for scheduling rebroadcast content, where the reception state information includes content identification information for identifying content represented by the broadcast wave received by the receiving section and indicates that the reception defection occurred in the reception of the content.

Here, the reception defection degree may be any parameter that indicates a state of the reception. For example, electric field intensity of reception, C/N ratio, S/N ration, a packet loss ratio calculated out from such parameter.

The content identification information may be any information that can identify the content. Examples of the content identification information encompass a content name, broadcast time and channel of the content, and the like information.

With this arrangement, the reception state communication section judges whether or not the reception defection degree detected by the detection section is more than the predetermined value, thereby to judge whether or not the reception defection occurred. If the reception defection degree detected by the detection section is more than the given value, the reception state notifying section transmits the reception state information to the rebroadcast content scheduling device. The reception state information includes the content identification information that indicates the content represented by the broadcast wave, that is, the content being received with the reception defection, and indicates that the reception defection occurred in the reception of the content.

By doing this, the rebroadcast content scheduling device can determine to rebroadcast, as the rebroadcast content, the content that was received with many reception defections. That is, the receiving device transmits the reception state information as a rebroadcast request. Therefore, without any manual operation by a user, the rebroadcast request for the content received with the reception defection is transmitted to the rebroadcast content scheduling device. Therefore, the user does not need to perform tedious operation for rebroadcast request, unlike in the conventional arrangement.

Moreover, if the reception defection degree detected by the detection section is larger than the predetermined value, the reception state information is transmitted immediately. Therefore, for every content, the rebroadcast content scheduling device can sum up the reception state information regarding the content immediately after the end of regular broadcast of the content. As a result, it is possible to shorten the time between the end of the regular broadcast and the determination of the rebroadcast.

Moreover, a receiving device according to the present invention is provided with: a receiving section for receiving a broadcast wave; a detection section for detecting a reception defection degree in the reception of the broadcast wave, the reception defection degree indicating how sever reception defection is; and a reception state notifying section for transmitting reception state information to a rebroadcast content scheduling device at a given timing, the rebroadcast content scheduling device being for scheduling rebroadcast content, where the reception state information includes content identification information for identifying content represented by the broadcast wave received by the receiving section and indicates the reception defection degree detected by the detection section.

With this arrangement, the rebroadcast content scheduling device can acquire, at the given timing from the receiving device, the reception defection degree and the content identification information that identifies the content being received. Therefore, for every content, the rebroadcast content scheduling device can grasp, at the given timing, a number such as how many receiving devices received the content with the reception defection. Therefore, the rebroadcast content scheduling device can determined, based on the number, which content is to be broadcasted.

Therefore, without any manual operation of the user, the rebroadcast content scheduling device can determine to rebroadcast the content that was received with the reception defection. That is, the user does not need to perform tedious operation for rebroadcast request, unlike in the conventional arrangement.

Moreover, for every content, whether to rebroadcast the content can be determined by the rebroadcast content scheduling device, based on the reception state information for the content after the end of the regular broadcast. As a result, it is possible to shorten the time between the end of the regular broadcast and the determination of the rebroadcast.

A rebroadcast content scheduling device according to the present invention is provided with a communication section for receiving reception state information transmitted from a receiving device, the receiving device detecting a reception defection degree in reception of a broadcast wave and transmitting the reception state information at a given timing, where the reception state information includes content identification information for identifying content represented by the broadcast wave received by the receiving device and indicates the reception defection degree; a summing section for summing up a characteristic amount regarding the reception defection degree for every content by using the content identification information contained in the reception state information received by the communication section where the reception defection degree is indicated by the reception state information; and a content scheduling section for determining, based on a result of the summing performed by the summing section, which content is to be rebroadcasted.

Here, as the characteristic amount, the summing section calculates, for example, an average of the reception defection ratios indicated by the reception state information from a plurality of the receiving devices. In an alternative, as the characteristic amount, the summing section calculates out a number of reception state information that indicates reception defection degrees larger than the predetermined value.

In this arrangement, the receiving state information is acquired from the plurality of receiving devices, the receiving state information (a) that includes the content identification information identifying the content represented by the broadcast wave that the receiving devices are receiving, and (b) that indicates the reception defection degree. With this arrangement, for every receiving device, the rebroadcast content scheduling device can grasp the content the receiving device is receiving and the reception defection degree in the reception of the content.

For every content, by using the content identification information, the summing section sums up the characteristic amount regarding the reception defection degree indicated by the reception state information. Further, based on the result of the summing, the content scheduling section determines which content is to be rebroadcasted. Therefore, which content is to be rebroadcasted can be determined considering the states of all the receiving devices.

As described above, the receiving device transmits the reception state information at the given timing and the rebroadcast content scheduling device, using the reception state information, determines which content is to be rebroadcasted. Because of this, without performing the manual operation for sending the rebroadcast request the viewer/listener can watch/listen the rebroadcast of the content that was received with the reception defection.

Moreover, which content is to be rebroadcasted is determined referring to the reception state information with respect to the content that is being received currently. Therefore, it is possible to shorten the time between the end of the regular broadcast and the determination of the rebroadcast.

For a fuller understanding of the nature and advantages of the invention, reference should be made to the ensuing detailed description taken in conjunction with the accompanying drawings.

BRIEF DESCRIPTION OF THE DRAWINGS

FIG. 4 is a view illustrating an example of EPG information displayed on a display section of the portable telephone of the first embodiment.

FIG. 5 is a view illustrating an example of reception defection notice information that a reception defection notice storage section of the portable telephone of the first embodiment stores therein.

FIG. 6 is a view illustrating an example of an area information table that an area information table storage section of the broadcast station of the first embodiment stores therein.

FIG. 7 is a view illustrating an example of a reception defection mail information that a reception defection list storage section of the broadcast station of the first embodiment stores therein.

FIG. 8 is a view illustrating an example of a piece of rebroadcast content candidate list that a sum result storage section of the broadcast station of the first embodiment stores therein.

FIG. 10 is a view illustrating an example of a reception defection notice mail.

FIG. 13 is a view illustrating an example of a rebroadcast notice mail.

FIG. 16 is a view illustrating an example of EPG information after it is decided which content is to be rebroadcasted from 12:00.

FIG. 17 is a view illustrating an example of sum result information that the sum result storage section stores therein at 12:00.

FIG. 18 is view illustrating an example of EPG information of a broadcast area after it is decided which content is to be rebroadcasted from 13:00.

FIG. 19 is a view illustrating an example of EPG information of a broadcast area C after it is decided which content is to be rebroadcasted from 13:00.

FIG. 20 is a view illustrating an example of sum result information of the broadcast area C, the sum result information being stored in the sum result storage section at 15:00.

FIG. 21 is a view illustrating an example of EPG information of the broadcast area C after it is decided which content is to be the rebroadcast content to be rebroadcasted from 16:00.

FIG. 23 is a view illustrating an example of a display screen of the portable telephone, the display screen displaying EPG information.

FIG. 24 is a view illustrating a time table for rebroadcasting rebroadcast contents in a second embodiment.

FIG. 25 is a view illustrating an example of sum result information in the second embodiment.

FIG. 26 is a view illustrating an example of EPG information of rebroadcast content in the second embodiment.

DESCRIPTION OF THE EMBODIMENTS

First Embodiment

An embodiment of the present invention is described below. To explain the present embodiment, the following discuses, by way of example, a case where a receiving device for receiving a broadcast wave (broadcast signal) is a portable telephone. It should be noted that the present invention is not limited to this arrangement, and the receiving device may be any device, which can receive the broadcast wave and is connected to an uplink communication network that allows the device to transmit some kind of information to a broadcast station.

Moreover, in the following explanation, the broadcast station is, by way of example, a broadcast station for transmitting a broadcast signal of digital terrestrial television broadcasting. It should be noted that the present invention is not limited to this, and the broadcast station may be any broadcast station for analog television broadcasting, satellite digital broadcasting, FM/AM radio broadcasting, internet broadcasting, or the like. (That is, the term "content" in the following explanation encompasses TV programs, radio programs, etc.) Further, in the following explanation, a communication network is, by way of example, the Internet network, but maybe any kind of communication network via which data can be transmitted. That is, the communication network may be an LAN (Local Area Network), WAN (Wide Area Network), wireless communication network, infrared communication network, 3G network, MMS network, or the like.

Figure 2:
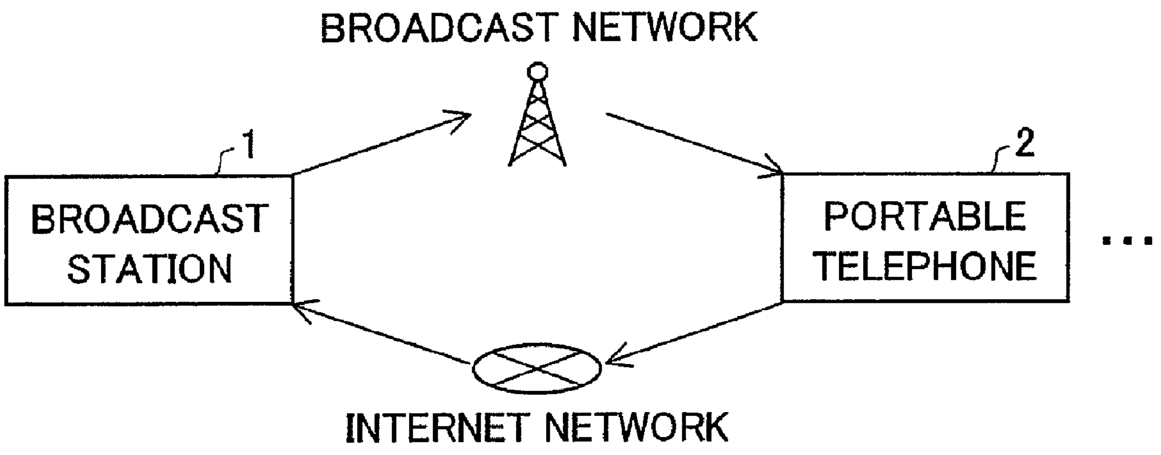
FIG. 2 a block diagram schematically illustrating a configuration of the rebroadcast content scheduling system of the first embodiment.

FIG. 2 is a view schematically illustrating a configuration of a rebroadcast content scheduling system according to the present embodiment. As illustrated in FIG. 2, the rebroadcast content scheduling system is provided with a broadcast station (rebroadcast content scheduling device) 1, a plurality of portable telephones (receiving devices) 2, the Internet network, and a broadcasting network.

Via the broadcasting network the broadcast station 1 transmits, to the portable telephones 2, the broadcasting signal for digital terrestrial television broadcasting. Moreover, the broadcast station 1 of the present embodiment receives a reception defection notice mail from a portable telephone 2, the reception defection notice mail indicating that the portable telephone 2 cannot receive the broadcasting signal normally. Based on the reception defection notice mail, the broadcast station 1 of the present embodiment schedules rebroadcast content. Here, the broadcast station 1 has the following broadcasting channels: regular broadcast channels (Ch1, Ch2, . . . ) and rebroadcast channel (Ch0). The broadcast station 1 broadcasts rebroadcast content via the rebroadcast channel.

Moreover, the broadcast network has an antenna in each broadcast area, whereby the broadcast station 1 can broadcast different pieces of rebroadcast content in different broadcast areas.

In the present embodiment, the broadcast station 1 schedules rebroadcast content according to the following rebroadcast content organization conditions (a) to (d):

(a) if a piece of content is to be rebroadcasted, the rebroadcast of the piece of content is performed after three hours or a longer time is elapsed since the regular broadcast of the content is finished. For example, in case where a piece of content whose regular broadcast is finished at 9:00, rebroadcast of the piece of content is performed at 12:00 or later. Here, the time 3 hours later than the time the regular broadcast is finished is referred to as a rebroadcast schedulable time.

(b) one hour before broadcasting start time, which rebroadcast content is to be broadcasted on the broadcasting start time is decided.

(c) it is set that final broadcast time of the rebroadcast channel is 2:00 PM. Due to the condition (a), content to be rebroadcasted is inevitably content whose regular broadcast is finished by 10:00 PM.

(d) rebroadcast of a piece of content is carried out by 2:00 AM on a next day of a day when the regular broadcast of the piece of content is carried out. That is, the rebroadcast of content is carried out within a day of broadcast on which the regular broadcast of the piece of content is performed. Here, "the same day of broadcast" is a period from the broadcast time of the regular broadcast of the first content to the broadcast finish time (i.e., 2:00 AM on the following day).

The portable telephone 2 is configured to receive a broadcast signal of the digital terrestrial television broadcasting broadcast, and to send a reception defection notice mail to the broadcast station 1 via the Internet network. The reception defection notice mail is for notifying that the reception of the broadcast signal was defective.

(Configuration of Portable Telephone)

Figure 3:
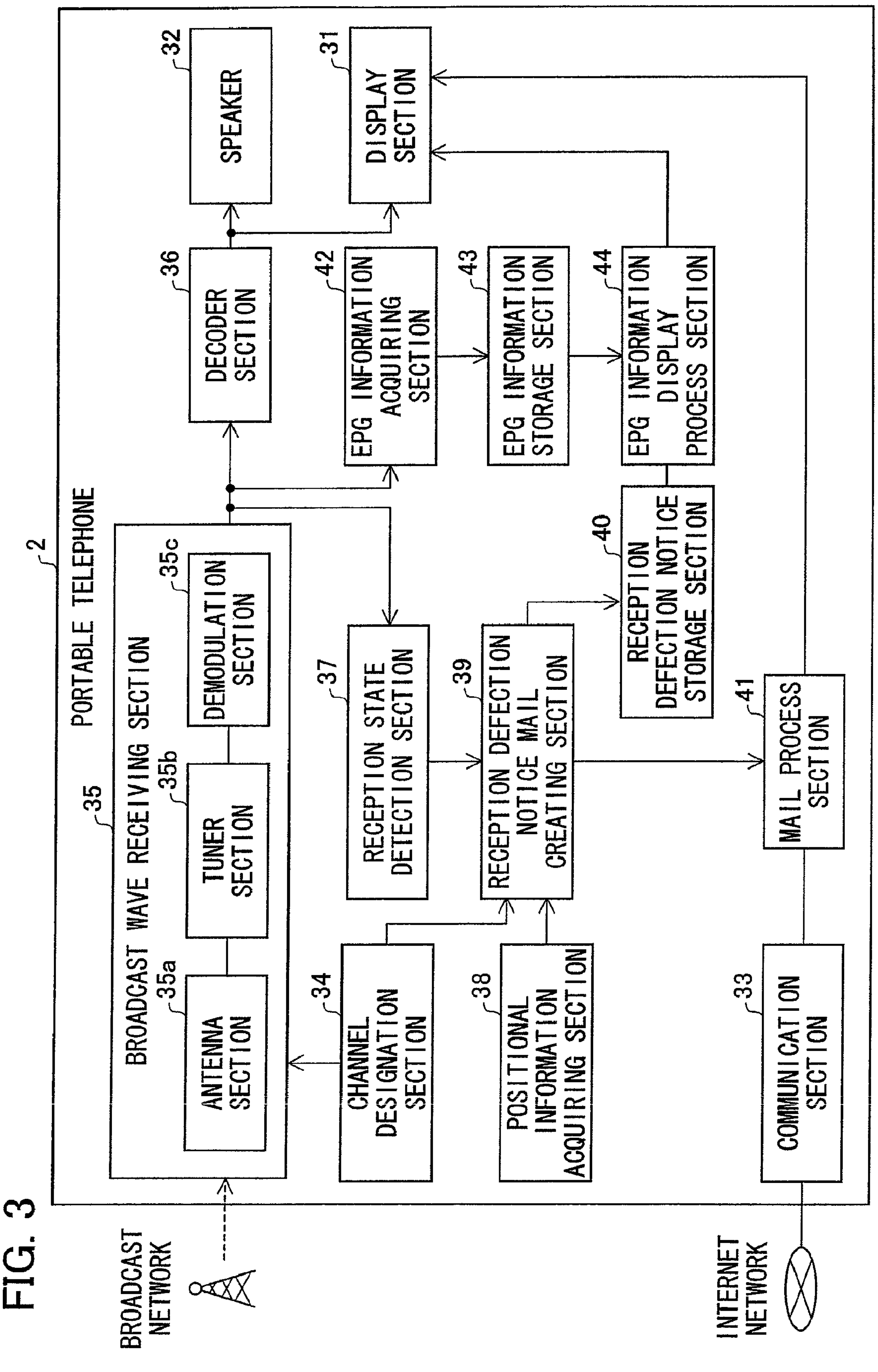
FIG. 3 is a block diagram illustrating a configuration of a portable telephone provided in the rebroadcast content scheduling system of the first embodiment.

FIG. 3 is a block diagram schematically illustrating a configuration of the portable telephone. As illustrated in FIG. 3, the portable telephone 2 is provided with a display section (display device) 31 (e.g., a liquid crystal display), a speaker 32, a communication section (reception state notifying means) 33, a channel designation section 34, a broadcast wave receiving section (receiving means) 35, a decoder section 36, a reception state detection section (detection means) 37, a positional information acquiring section (positional information acquiring means) 38, a reception defection notice mail creating section (reception state notifying means) 39, a reception defection notice storage section 40, a mailing process section (reception state notifying means) 41, an EPG information acquiring section 42, an EPG information storage section 43, and an EPG information display process (EPG display process means) 44.

The communication section 33 is configured to transmit/receive data (such as an electronic mail) to/from an external apparatus via the Internet.

The channel designation section 34 is configured to perform channel designation to designate a broadcast signal to receive. The channel designation section 34 perform the channel designation setting according to an instruction inputted into an operation section (not illustrated).

The broadcast wave receiving section 35 is configured to receive and then demodulate a broadcast signal of the digital terrestrial television broadcasting broadcast, and to output the thus demodulated broadcast signal to the decoder section 36. The broadcast wave receiving section 35 is provided with an antenna section 35*a*, a tuner section 35*b*, and a demodulation section 35*c*.

The tuner section 35*b* receives, via the antenna section 35*a*, the broadcast signal of the channel designated by the channel designation section 34, and outputs the thus received broadcast signal to the demodulation section 35*c*. Moreover, the tuner section 35*b* notifies the reception state detection section 37 of an electric field intensity of the received signal.

Moreover, the demodulation section 35*c* demodulates the received signal that is modulated, e.g., in an OFDM modulation method. The demodulation section 35*c* outputs the thus demodulated signal to the decoder section 36 and the EPG information acquiring section 42. Further, the demodulation section 35*c* detects an C/N ratio of the received signal and outputs, to the reception status detection section 37, a detection signal regarding the C/N ratio.

The decoder section 36 is configured to receive the received signal from the demodulation section 35*c* and decodes the received signal into video data and audio data. The decoder section 36 then outputs the video data and audio data to the display section and speaker respectively.

The reception state detection section 37 is configured to calculate a packet loss ratio (reception defection degree) of the received signal, based on the electric field intensity of the received signal and the C/N ratio (the electric field intensity is informed by the tuner section 35*b* and the C/N ratio is informed by the demodulation section 35*c*.

The positional information acquiring section 38 is provided with GPS (Global Positioning System) receiver. By using the GPS receiver, the positional information acquiring section 38 acquires positional information that indicates a current position of the portable telephone 2. The positional information indicates a longitude and a latitude.

The reception defection notice mail creating section 39 creates a reception defection notice mail, based on the packet loss ratio thus calculated by the reception status detection section 37. The reception defection notice mail contains content identification information that identifies the content that is not received normally (i.e., reception defection), and notifies that the reception defection occurred. The reception defection notice mail creating section 39 outputs the thus created reception defection notice mail to the mail process section 41.

More specifically, if the reception defection notice mail creating section 39 detects that the packet loss ratio calculated out by the reception state detection section 37 becomes equal to or more than a predetermined value (e.g., 5%), the reception defection notice mail creating section 39 acquires the positional information from the positional information acquiring section 38, and channel information from the channel designation section 34, the channel information indicating the channel currently designated. Then, the reception defection notice mail creating section 39 creates the reception defection notice mail. The reception defection notice mail is for notifying the thus acquired positional information and channel information, and the packet loss ratio, which is calculated out by the reception state detection section 37. The reception defection notice mail creating section 39 transmits the thus created reception defection notice mail to the broadcast station 1 via the mail process section 41.

Here, the reception defection notice mail creating section 39 creates and transmits the reception defection notice mail right after it is detected that the packet loss ratio calculated by the reception state detection section 37 becomes equal to or more than the predetermined value (e.g., 5%). Therefore, transmission time of the reception defection notice mail is almost the same time as when the packet loss ratio calculated by the reception state detection section 37 becomes equal to or more than the predetermined value (e.g., 5%).

Therefore, in the present embodiment, the reception defection notice mail creating section 39 notifies the broadcast station 1 of the transmission time of the reception defection notice mail as reception defection occurrence time.

According to the reception defection occurrence time and the channel information, it is possible to identify the content that is received by the portable telephone 2 when the reception defection occurred. Therefore, in this embodiment, the content identification information contains the transmission time corresponding to the reception defection occurrence time, and the channel information.

Further, the reception defection notice mail creating section 39 stores, in the reception defection notice storage section 40, the reception defection notice information that indicates (a) the channel information and (b) the reception defection occurrence time in association with each other, which are to be notified by the thus created reception defection notice mail.

The reception defection notice storage section 40 is configured to store the reception defection notice information therein. For example as illustrated in FIG. 5, the reception defection notice information indicates the channel information and the reception defection occurrence time in association with each other, the channel information indicating which channel was designated when the reception defection occurred.

The mail process section 41 is configured to receive/transmit an electronic mail via the communication section 33. The mail process section 41 transmits the reception defection notice mail to the broadcast station 1 via the communication section 33, the reception defection notice mail being generated by the reception defection notice mail creating section 37. Moreover, the mail process section 41 receives, via the communication section 33, an electronic mail from the broadcast station 1 and causes the display section 31 to display the thus received electronic mail thereon.

The EPG information acquiring section 42 extracts EPG (Electronic Program Guide) information out of the received signal forwarded thereto from the demodulation section 35*c*. The EPG information indicates broadcast time of each content. The EPG information acquiring section 42 stores the thus extracted EPG information in the EPG information storage section 43. The EPG information acquiring section 42 acquires the EPG information at a predetermined timing (e.g., the portable telephone 2 starts up television reception process), and when it is detected that an EPG information acquiring instruction is inputted in an operating section (not illustrated).

Upon detecting that an instruction to display the EPG information is inputted in the operating section (not illustrated), the EPG information display process section 44 reads the EPG information out of the EPG information storage section 43, and performs a process of causing the display section 31 to display the thus read-out EPG information thereon.

FIG. 4 is a view illustrating an example of a screen illustrating the EPG information, the screen being displayed on the display section 31 by the EPG information display process section 44. As illustrated in FIG. 4, the EPG information indicates content names of contents to be broadcasted and the broadcast start times and broadcast finish times of the contents for each channel.

For displaying the EPG information, the EPG information display process section 44 of the present embodiment performs the following process: the EPG information display process section 44 reads out all the reception defection notice information from the reception defection notice storage section 40. Then, looking up the EPG information (which is stored in the EPG information storage section 43) of the regular broadcast channel, the EPG information display process section 44 finds out the content name of the content that was being broadcasted at the reception defection occurrence time of the reception defection notice information at the channel indicated by the channel information of the reception defection notice information.

Further, the EPG information display process section 44 judges whether the content name thus found out from the EPG information of the regular broadcast channel exists in EPG information for the rebroadcast channel. If the content name thus found out from the EPG information of the regular broadcast channel exists in the EPG information for the rebroadcast channel, the EPG information display process section 44 changes, in the EPG information for the rebroadcast channel, a color of a cell of the content name identical with the content name thus found out from the EPG information of the regular broadcast channel. Then, the EPG information for the rebroadcast channel is displayed with the cell changed in color.

(Configuration of Broadcast Station)

Figure 1:
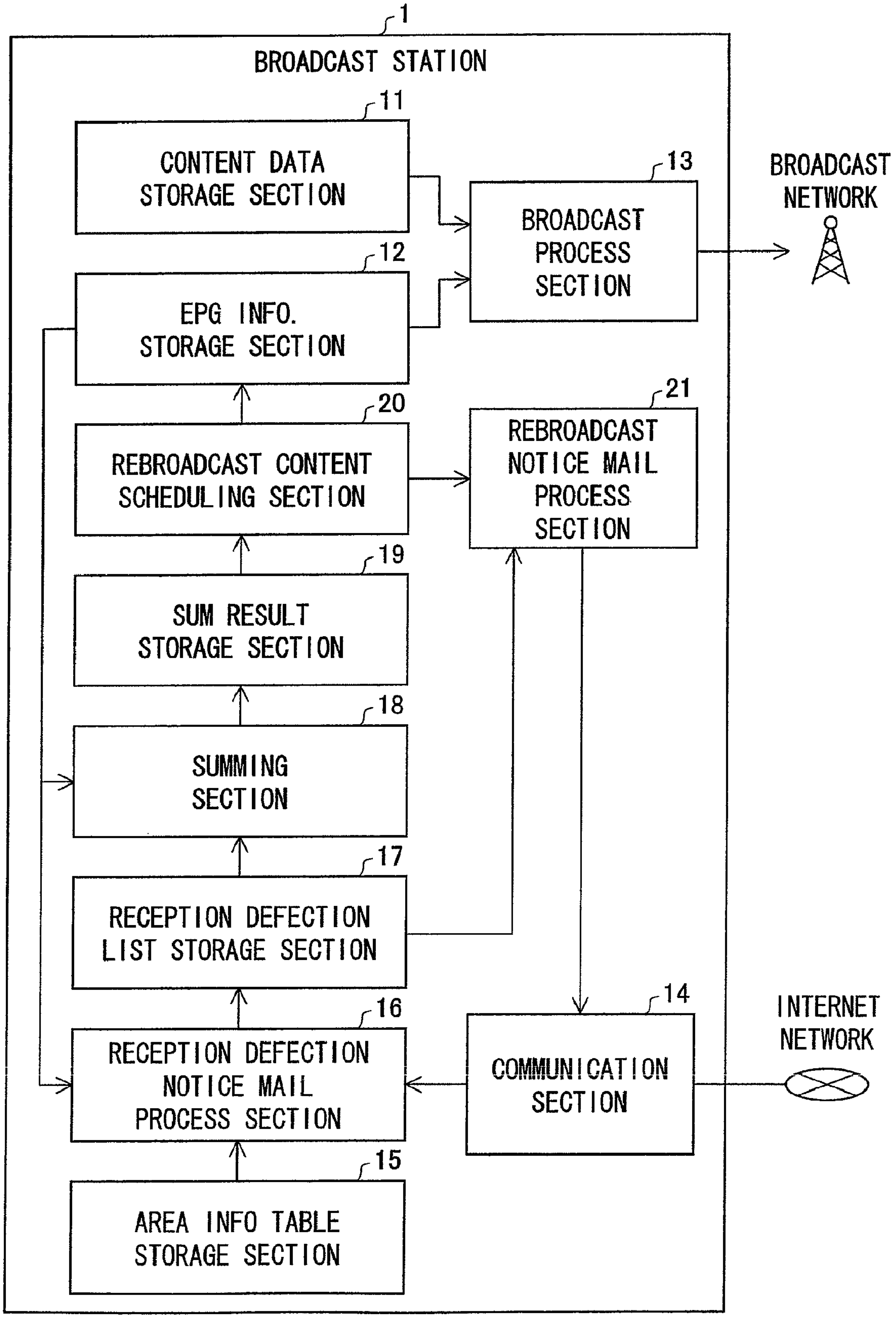
FIG. 1 is a block diagram illustrating a configuration of a broadcast station provided in rebroadcast content scheduling system of a first embodiment.

FIG. 1 is a block diagram illustrating an internal configuration of the broadcast station 1. As illustrated, the broadcast station 1 is provided with a content data storage section 11, an EPG information storage section 12, a broadcasting process section 13, a communication (communication means) 14, an area information table storage section (broadcast area identification information storage section) 15, a reception defection notice mail process section (summing means) 16, a reception defection list storage section 17, a summing section (summing means) 18, a sum result storage section 19, a rebroadcast content scheduling section (content scheduling means) 20, and a rebroadcast notice mail process section (rebroadcast notifying means) 21.

The content data storage section 11 is configured to store content data of contents.

The EPG information storage section 12 is configured to store EPG information for each broadcast area. The EPG information indicates, for the respective broadcast areas, content names, broadcast start times, and broadcast finish times, of content to be broadcasted at respective channels. The EPG information for the rebroadcast channel, which is stored in the EPG information storage section 12, is updated by the rebroadcast content scheduling section 20.

According to the EPG information stored in the EPG information storage section 12, the broadcasting process section 13 reads, out of the content data storage section 11, the content data of the content to be broadcasted. The broadcasting process section 13 converts the thus read-out content data into broadcast signals and transmits the broadcast signals to the broadcast network. The broadcasting process section 13 includes the EPG information in the broadcast signals.

The communication section 14 receives/transmits data from/to the portable telephone 2 via the Internet network. The communication section 14 receives the reception defection notice mail from the portable telephone 2 and outputs the thus received reception defection notice mail to the reception defection notice mail process section 16. Moreover, the communication section 14 transmits a rebroadcast notice mail that is forwarded thereto from the rebroadcast notice mail process section 21.

The area information table storage section 15 is configured to store therein an area information table. The area information table indicates, as illustrated in FIG. 6, broadcast area identification information and coverage area information in association. The broadcast area identification information identifies each broadcast area. The coverage area information indicates a coverage area in which the broadcast signals can be received from an antenna provided in a given broadcast area.

The reception defection notice mail process section 16 creates reception defection mail information, based on the reception defection notice mail forwarded thereto from the communication section 11. The reception defection mail information indicates, in association, (a) an electronic mail address of the portable telephone 2 that transmitted the reception defection notice mail, (b) broadcast area identification information corresponding to the broadcast area in which this portable telephone 2 is currently positioned, (c) the content name of the content that the portable telephone 2 received defectively, and (d) packet loss ratio indicated by the reception defection notice mail. The reception defection notice mail process section 16 stores the thus created reception defection mail information in the reception defection list storage section 17.

More specifically, the reception defection notice mail process section 16 extracts, out of the reception defection notice mail forwarded thereto from the communication section 14, (a) the electronic mail address, (b) positional information, (c) channel information, (d) transmission time, (e) packet loss ratio, of the sender of the reception defection notice mail. The reception defection notice mail process section 16 specifies the coverage area information covering a position indicated by the positional information thus extracted. Then, the reception defection notice mail process section 16 reads, out of the area information table storage section 15, broadcasting identification information that corresponds to the thus specified coverage area information.

Moreover, the reception defection notice mail process section 16 reads, out of the EPG information storage section 12, the content name of the content whose regular broadcast was being performed at the thus extracted transmission time (which is almost the same time as the reception defection occurrence time) at the channel indicated by the thus extracted channel information. The reception defection notice mail process section 16 creates the reception defection mail information, which indicates, in association, the sender's electronic mail address and packet loss ratio thus extracted from the reception defection notice mail, and the broadcast area identification information and the content name thus read out respectively from the area information table storage section 15 and the EPG information storage section 12. Then, the reception defection notice mail process section 16 stores the reception defection mail information in the reception defection list storage section 17.

The reception defection list storage section 17 is configured to store the reception defection mail information therein. FIG. 7 is a view illustrating an example of the reception defection mail information stored in the reception defection list storage section 17. As illustrated in FIG. 7, the reception defection list storage section 17 stores, for example, a reception defection notice mail "No. I" that indicates an electronic mail address "aaa@hoge.com", broadcast area identification information "Broadcast Area A", content name "Good Morning News", and packet loss ratio "12".

Referring to the reception defection mail information stored in the reception defection list storage section 17, the summing section 18 sums up how many time the reception defection occurred for each content per broadcast area.

More specifically, the summing section 18 counts up reception defection mail information having the same broadcast area and content name, among the reception defection mail information stored in the reception defection list storage section 17, thereby to obtain a reception defection count (defective count).

Further, the summing section 18 stores, in the sum result storage section 19, the content names and the reception defection counts thereof for every broadcast area in such a manner that the reception defection counts and the content names are stored in association with each other.

More specifically, the summing section 18 reads out, from the EPG information storage section 12, the broadcast start time and broadcast finish time of the content whose regular broadcast is finished. The summing section 18 calculates out a content length of the content from the thus read-out broadcast start time and broadcast finish time. As mentioned above, it is put in the present embodiment that the rebroadcast schedulable time is 3 hours later than the broadcast finish time of the regular broadcast. Accordingly, the summing section 18 calculates the rebroadcast schedulable time from the broadcast finish time thus read out from the EPG information storage section 12. The summing section 18 stores sum result information in the summing result storage section 19 for every broadcast area. The sum result information contains, in association, the content name, the thus counted reception defection count, and the thus calculated content length, and rebroadcast schedulable time, of the content in question.

For every content, the sum result storage section 19 stores the sum result information of the content for every broadcast area, the sum result information indicating, in association, the content name, the thus counted reception defection count, and the thus calculated content length, and rebroadcast schedulable time, of the content, e.g., as illustrated in FIG. 8.

Referring to the sum result information for every broadcast area, the rebroadcast content scheduling section 20 determines, for every broadcast area, which content (rebroadcast content) is to be rebroadcasted, and when is broadcast start time for the rebroadcast content. A specific example of the scheduling process performed by the rebroadcast content scheduling section 20.

Moreover, the rebroadcast content scheduling section 20 creates the EPG information of the rebroadcast channel for every broadcast area, according to the determination. Then, according to the thus created EPG information, the rebroadcast content scheduling section 20 updates the EPG information stored in the EPG information storage section 12.

Further, the rebroadcast content scheduling section 20 outputs, to the rebroadcast notice mail process section 21, a rebroadcast content name of the content to determined to be rebroadcasted, and rebroadcast start time and the broadcast area at/in which the content determined to be rebroadcasted.

The rebroadcast notice mail process section 21 is configured to create the rebroadcast notice mail. By the rebroadcast notice mail, that portable telephone 2 which transmitted the reception defection notice mail for the regular broadcast of the content is informed that the content in question is to be rebroadcasted. Further, the rebroadcast notice mail process section 21 transmits the thus created rebroadcast notice mail to the portable telephone 2 via the communication section 14.

More specifically, the rebroadcast notice mail process section 21 reads out, from the reception defection mail information, that electronic mail address which is in association with both of the content name and broadcast area identification information that are respectively identical with as the rebroadcast content name and the rebroadcast area information informed from the rebroadcast content scheduling section 20, the reception defection mail information stored in the reception defection list storage section 17. Then, the rebroadcast notice mail process section 21 creates the rebroadcast notice mail that is addressed to the thus read-out electric mail address. The rebroadcast notice mail is for notifying that the content of the rebroadcast content name informed from the rebroadcast content scheduling section 20 is to be broadcasted at the rebroadcast start time informed from the rebroadcast content scheduling section 20.

(Flow of Processes of Rebroadcast Content Scheduling System)

Figure 9:
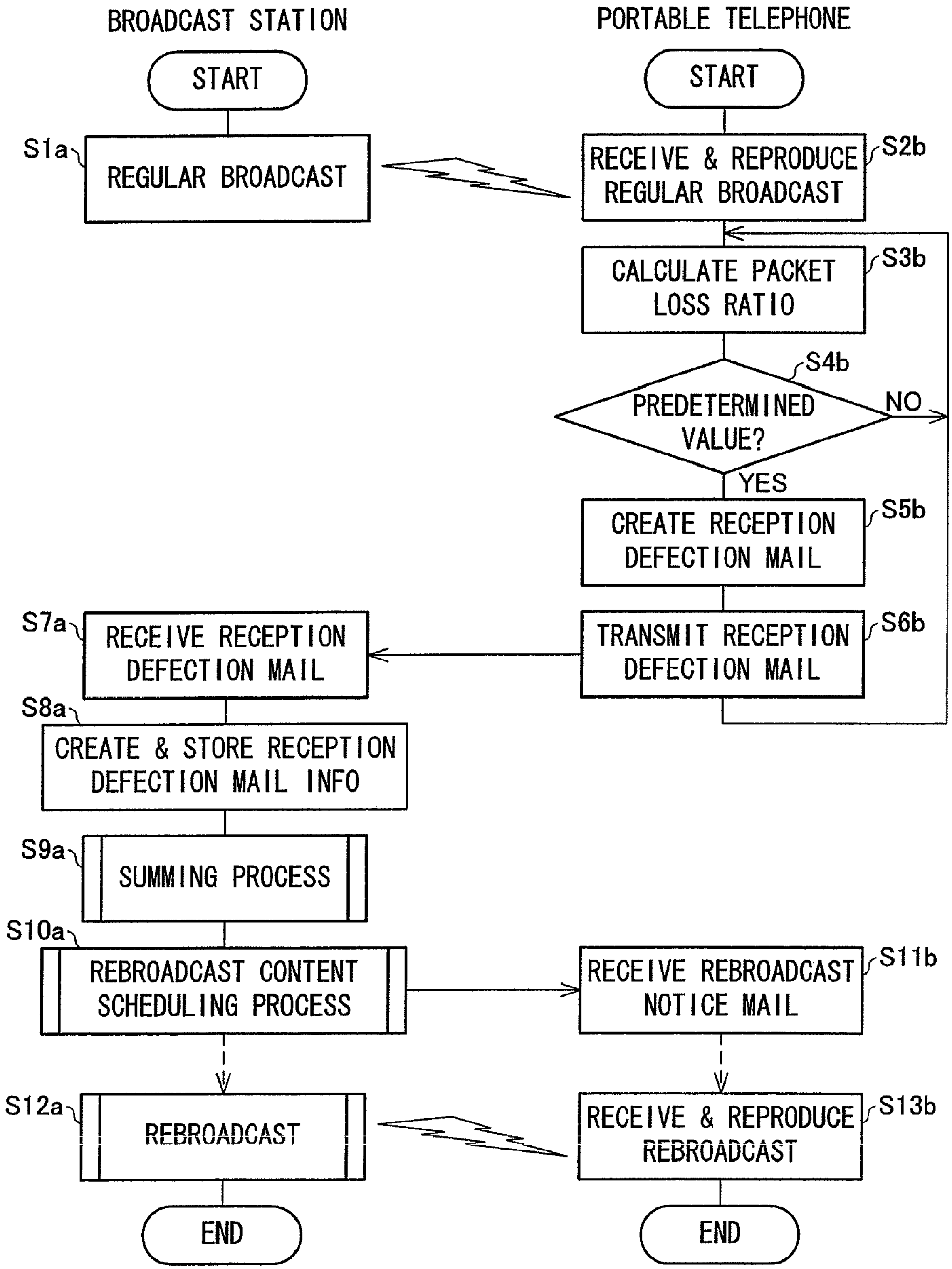
FIG. 9 is a flow chart illustrating a flow of whole process of rebroadcast content automatic scheduling system in the first embodiment.

Next, a flow of processes of the rebroadcast content scheduling system is described below referring to a flowchart of FIG. 9.

To begin with, in the broadcast station 1, the broadcasting process section 13 performs regular broadcast via the regular broadcast channel, according to the EPG information stored in the EPG information storage section 12 (S1*a*: hereinafter, processes performed by the broadcast station are labeled with "a").

For example, assume that, for the regular broadcast channel, the EPG information storage section 12 stores the EPG information as illustrated in FIG. 4, the EPG information being common to all the broadcast areas. In this case, the broadcast process section 13 reads out, from the content data storage section 11, content data of content "Good Morning News" of Channel 1 and converts the thus read-out content data into broadcast signals before a clock section (not illustrated) strikes 8:00. When detecting that the clock section strikes 8:00, the broadcast process section 13 transmits the broadcast signals to the broadcasting network. The broadcast process section 13 performs regular broadcast of other contents in a similar manner.

On the other hand, in the portable telephone 2, the tuner section 35*b* receives, via the antenna section 35*a*, the broadcast signals of the channel designated by the channel designation section 34. The demodulation section 35*c* demodulates the received signal received by the tuner section 35*b*, and outputs the thus demodulated received signal to the decoder section 36. The decoder section 36 decodes, into video data and audio data, the received data transmitted thereto from the demodulation section 35*c*. Then, the decoder section 36 outputs the video data and audio data respectively to the display section 31 and the speaker 32 (S2*b*: hereinafter, processes performed by the portable telephone are labeled with "b").

Meanwhile, the tuner section 35*b* outputs electric field intensity of the received signal to the reception state detection section 37, and the demodulation section 35*c* outputs a C/N ratio of the received signal to the reception state detection section 37.

Next, the reception state detection section 37 calculates out a packet loss ratio from the electric field intensity and the C/N ratio, which are respectively informed from the tuner section 35*b* and the demodulation section 35*c* (S3*b*).

After that, the reception defection notice mail creating section 39 judges whether or not the packet loss ratio thus calculated out by the reception state detection section 37 ≧a predetermined value (e.g., 5%) (S4*b*).

If the packet loss ratio is less than the predetermined value ("No" at S4*b*), the process returns to S3*b*.

If the packet loss ratio is equal to or more than the predetermined value ("Yes" at S4*b*), the reception defection notice mail creating section 39 acquires current positional information from the positional information acquiring section 38, and acquires channel information from the channel designation section 34, the channel information indicating a channel that is currently designated. Then, the reception defection notice mail creating section 39 creates a reception defection notice mail for notifying of the positional information and the channel information thus acquired, and of the packet loss ratio thus calculated out by the reception state detection section 37 (S5*b*).

After that, the mail process section 41 transmits, to the broadcast section 1, the reception defection notice mail thus created by the reception defection notice mail creating section 39 (S6*b*).

FIG. 10 is a view illustrating an example of the reception defection notice mail thus created by the reception defection notice mail creating section 39. As illustrated in FIG. 10, the reception defection notice mail creating section 39 creates the reception defection notice mail which says, in its text, (a) the positional information acquired from the positional information acquiring section 38 and indicating the longitude and latitude (in FIG. 10, "Lat=42.5" "Lon=135.9"), (b) the channel information acquired from the channel designation section 34 (in FIG. 10, "Channel=1", where "1" indicates "Ch 1"), and (c) the packet loss ratio thus calculated out by the reception state detection section 37 (in FIG. 10, "Level=12"). The reception defection notice mail generating section 39 addresses the reception defection notice mail to an address of the broadcast station 1 (the address of the broadcast 1 is preset; in FIG. 10, "TV@foo.com"). Moreover, transmission time of the reception defection notice mail is almost same as the reception defection occurrence time.

Moreover, meanwhile, the reception defection notice mail creating section 39 stores, in the reception defection notice storage section 40, reception defection notice information that indicates, in association, the channel information and reception defection occurrence time, which is indicated in the thus created reception defection notice mail.

Next, in the broadcast station 1, the communication station 14 receives the reception defection notice mail from the portable telephone 2 (S7*a*).

After that, the reception defection notice mail process section 16 extracts the electronic mail address of the sender, positional information, channel information, transmission time, and packet loss ratio, out of the reception defection notice mail. Then, the reception defection notice mail process section 16 reads out, from the area information table storage section, that broadcast area identification information which corresponds to that coverage area information which includes the thus extracted positional information. Further, the reception defection notice mail process section 16 reads out, form the EPG information storage section 12, a content name of content broadcasted at the thus extracted transmission time at the channel indicated by the thus extracted channel information.

The reception defection notice mail process section 16 creates a reception defection mail list which indicates, in association, the electronic mail address and packet loss ratio thus extracted from the reception defection notice mail, the broadcast area identification information thus read out from the area information table storage section 15, and the content name thus read out from the EPG information storage section 12. Then, the reception defection notice mail process section 16 stores the thus created reception defection mail information in the reception defection list storage section 17 (S8*a*).

For example, in an event that the reception defection notice mail process section 16 receives a reception defection notice mail as illustrated in FIG. 10, the reception defection notice mail process section 16 creates reception defection mail information as illustrated at "No. 1" in FIG. 7.

After that, the summing section 18 performs summing process to sum up the reception defection mail information after an end of broadcast for every content, and update the sum result storage section 19 (S9*a*). The summing process will be described later in detail.

Next, the rebroadcast content scheduling section 20 performs scheduling process for rebroadcast content by using the sum result information stored in the sum result storage section 19 (S10*a*). Meanwhile, the rebroadcast notice mail process section 21 creates a rebroadcast notice mail according to what the scheduling process schedules. Then, the rebroadcast notice mail process section 21 transmits the thus created rebroadcast notice mail to the portable telephone 2. The mail process section 41 of the portable telephone 2 receives the rebroadcast notice mail and causes the display section 31 to display the thus received mail (S11*b*). The scheduling process for the rebroadcast content (S10*a*) will be described later in detail.

The broadcast process section 13 performs rebroadcast according to the EPG information for the rebroadcast channel (S12*a*), the EPG information being updated by the rebroadcast content scheduling section 20. The process of rebroadcast will be described later. Moreover, the portable telephone 2 receives and reproduces the broadcast signals of the rebroadcast content (S13*b*).

(Flow of Summing Process)

Figure 11:
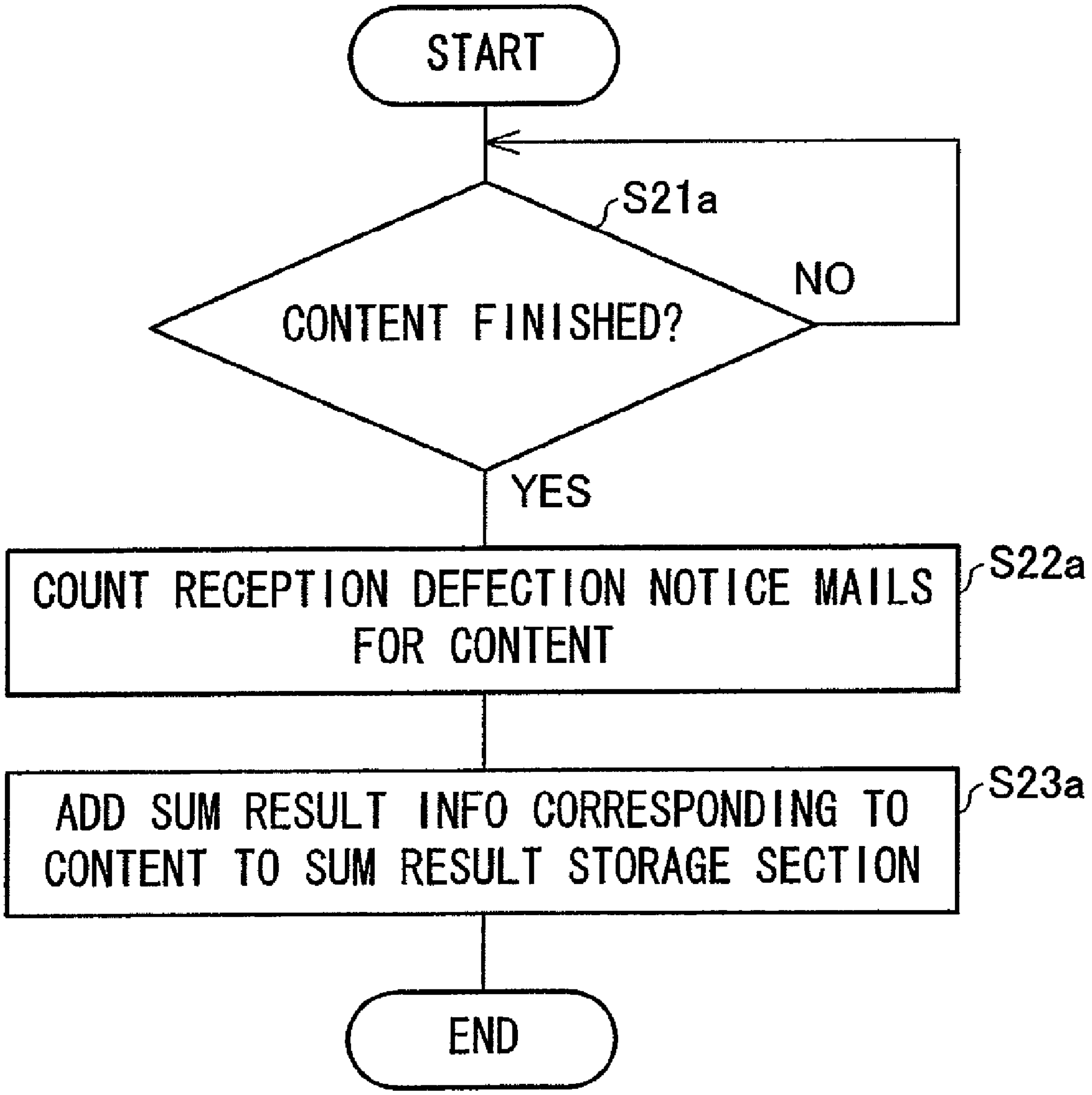
FIG. 11 is a flow chart illustrating a flow of summing-up process in the first embodiment.

Next, a flow of the summing process of S9*a* is described below referring to a flow chart of FIG. 11.

For every content (regular broadcast content) broadcasted at a regular broadcast channel, the summing section 18 judges, referring to current time and EPG information of the regular broadcast channel, whether or not the broadcast of the regular broadcast content is finished (S21*a*). The current time is indicated by the clock section (not illustrated) and the EPG information is stored in the EPG information storage section 12. If the broadcast of the regular broadcast content has not been finished yet ("No" at S21*a*), the step S21*a* is repeated.

On the other hand, if the broadcast of the regular broadcast content ("Yes" at S21*a*), the summing section 18 reads out the content name of the regular broadcast content from the EPG information storage section 12. Then, the summing section 18 looks up the reception defection list storage section 17 and counts, for every broadcast area, the reception defection mail information that corresponds to the content name (S22*a*).

More specifically, the summing section 18 extracts, out of the reception defection mail information, that reception defection mail information which is in association with the content name and the broadcast area identification information respectively identical with the content name of the regular broadcast content whose broadcast has been finished, and broadcast area identification "Area A". Then, the summing section 18 counts the reception defection mail information thus extracted. The summing section 18 regards the count as defection count in the broadcast area A for the regular broadcast content whose broadcast has been finished. Similarly, the summing section 18 performs counting for other broadcast areas.

After that, the summing section 18 reads out, from the EPG information storage section 12, the broadcast start time and broadcast finish time that are associated with the content name thus read out from the EPG information storage section 12 at S22*a*. Then, the summing section 18 calculates the content length of the content from the broadcast start time and the broadcast finish time thus read out. Further, the summing section 18 sets such that a time 3 hours later than the thus read-out broadcast finish time is the rebroadcast schedulable time.

The summing section 18 creates the sum result information for the regular broadcast content whose broadcast has been finished. The sum result information indicates, in association, the content name thus read out from the EPG information storage section 12 at S22*a*, the defection count, the content length, and the rebroadcast schedulable time. Then, the summing section 18 stores the thus created sum result information in the sum result storage section 19 (S23*a*). Thereby, the summing section 18 finishes this process.

For example, assume that the broadcast station 1 receives reception defection notice mails from thirty portable telephones 2 among portable telephones 2 receiving the content "Good Morning News" starting from 8:00 at a regular broadcast channel, Ch 1.

In this case, the reception defection list storage section 17 stores thirty pieces of reception defection mail information that indicate the content name "Good Morning News" and broadcast area identification information "broadcast area A", as at No. 1 in FIG. 7.

Then, referring to the EPG information (i.e., the broadcast finish time "9:00" of the content name "Good Morning News") stored in the EPG information storage section 12, the summing section 18 starts, at the broadcast finish time 9:00, counting of the reception defection mail information for the content name "Good Morning News" with respect to the broadcast area A (here, the count is 30).

After that, the summing section 18 reads out, from the EPG information storage section, the broadcast start time "8:00" and the broadcast finish time "9:00" that are stored in association with the content name "Good Morning News". From the thus read-out broadcast start time broadcast finish time, the content length "one hour" and the rebroadcast schedulable time "12:00 or later" of the content.

Then, as illustrated in FIG. 8, the summing section 18 creates sum result information of the broadcast area A, which indicates the content name "Good Morning News", content length "one hour", rebroadcast schedulable time "12:00 or later", and defection count "30" in association with each other.

(Flow of Scheduling Process of Rebroadcast Content)

Figure 12:
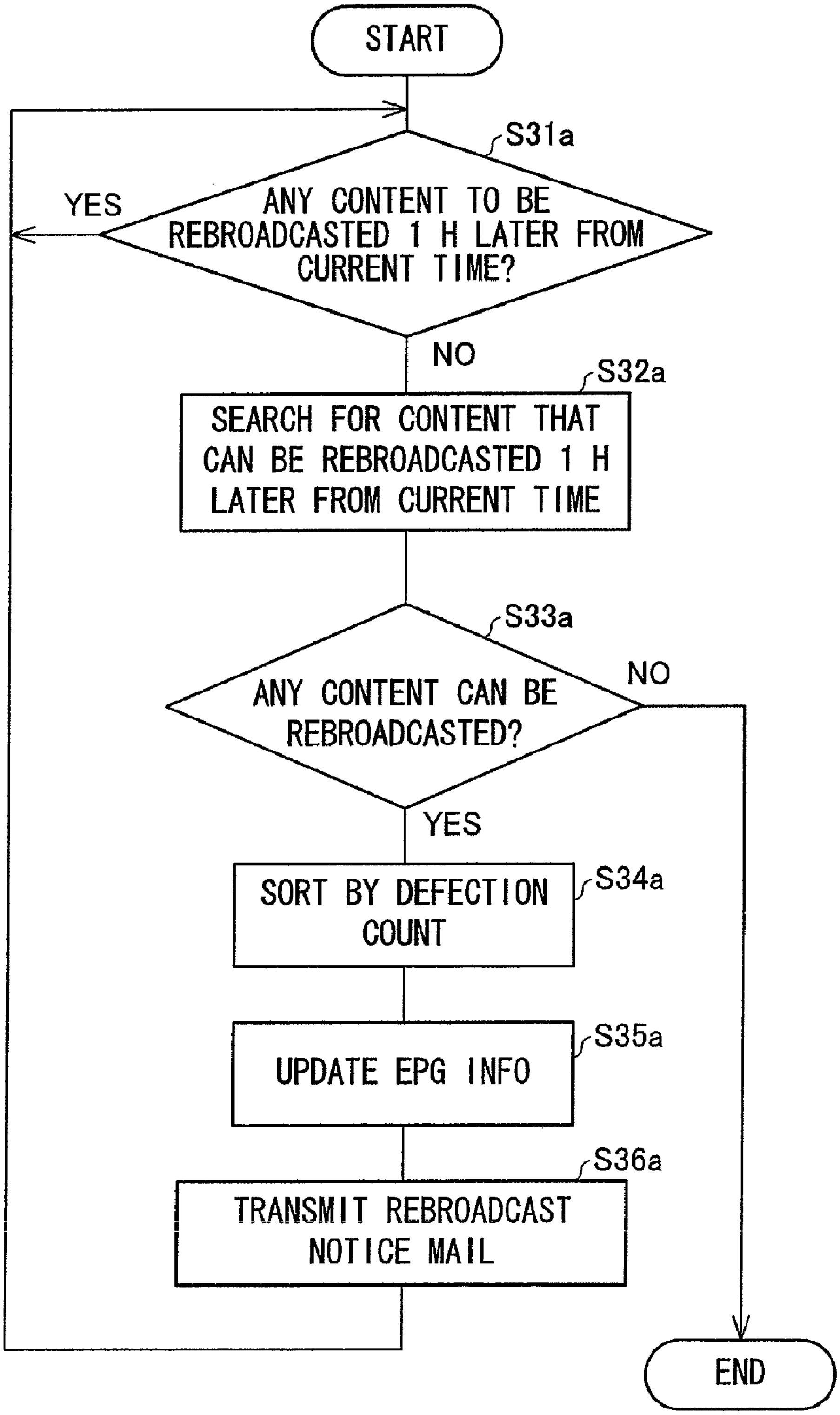
FIG. 12 is a flow chart illustrating a flow of rebroadcast content scheduling process in the first embodiment.

Next, the flow of the scheduling process (S10*a*) of the rebroadcast content is described below, referring to a flow chart illustrated in FIG. 12. As described above, the rebroadcast content scheduling section 20 performs the scheduling process of the rebroadcast content for every broadcast area. Because similar scheduling process is performed for every broadcast area, the scheduling process of the rebroadcast content in the broadcast area A is explained.

To begin with, the rebroadcast content scheduling section 20 reads the current time from the clock section (not illustrated) and reads out, from the EPG information storage section 12, EPG information for rebroadcast channel Ch 0 in the broadcast area A. Then, the rebroadcast content scheduling section 20 judges whether, in the read-out EPG information, any rebroadcast is scheduled at a time one hour later than the current time or not (S31*a*).

If any rebroadcast is scheduled at the time one hour later than the current time ("Yes" at S31*a*), the step S31*a* is repeated.

On the other hand, if no rebroadcast is scheduled at the time one hour later than the current time ("No" at S31*a*), the rebroadcast content scheduling section 20 reads out, from the sum result storage section 19, the sum result information for the broadcast area A. Then, the rebroadcast content scheduling section 20 searches for sum result information having (a) the rebroadcast schedulable time satisfying the following condition A and (b) the content length satisfying the following condition B, from among the pieces of sum result information thus read-out (S32*a*). That is, the rebroadcast content scheduling section 20 searches for a piece of content that can be rebroadcasted at the time one hour later than the current time.

Condition A: rebroadcast schedulable time is at or after the time one hour later than the current time Condition B: a time (one hour plus content length) later than the current time is at or before the final broadcast finish time 2:00 for the rebroadcast channel.

Then, the rebroadcast content scheduling section 20 judges whether there is any sum result information that satisfies the conditions A and B (S33*a*)+That is, the rebroadcast content scheduling section 20 judges whether there is any content that can be rebroadcasted at the time one hour later than the current time.

If there is sum result information that satisfies the conditions A and B ("Yes" at S33*a*), the rebroadcast content scheduling section 20 extracts, from among the sum result information, that sum result information which has a largest defection count (S34*a*). Then, the rebroadcast content scheduling section 20 determines to rebroadcast, at one hour later than the current time, the content of the content name indicated by the thus extracted sum result information. Accordingly, the rebroadcast content scheduling section 20 deletes, from the sum result storage section 19, that sum result information which corresponds to the content that is determined to be rebroadcasted.

Next, according to the determination, the rebroadcast content scheduling section 20 creates the EPG information of the rebroadcast channel for the broadcast area A. Then, the rebroadcast content scheduling section 20 overwrites the EPG information storage section 12 with the thus created EPG information (S35*a*).

After that, the rebroadcast content scheduling section 20 outputs, to the rebroadcast notice mail process section 21, the rebroadcast content name and rebroadcast start time of the content (rebroadcast content) that is determined to be rebroadcasted, and rebroadcast area information that indicates the broadcast area A in which the content is determined to be rebroadcasted.

The rebroadcast notice mail process section 21 reads out, from the reception defection mail information, that electronic mail address which is associated with the content name and broadcast area identification information identical with the rebroadcast content name and rebroadcast area information transmitted thereto from the rebroadcast content scheduling section 20, the reception defection mail information being stored in the reception defection list storage section 17. Then, the rebroadcast notice mail process section 21 creates a rebroadcast notice mail being addressed to the electronic mail address and notifying that the content of the rebroadcast content name informed from the rebroadcast content scheduling section 20 is to be rebroadcasted from the rebroadcast start time informed from the rebroadcast content scheduling section 20. Then, the rebroadcast notice mail process section 21 transmits the thus created rebroadcast notice mail to the portable telephones 2 (S36*a*). FIG. 13 is a view illustrating an example of the rebroadcast notice mail.

After that the processes returns to S31*a*.

On the other hands, if there is no sum result information satisfying the conditions A and B ("No" at S33*a*), the process is terminated.

(Flow of Rebroadcast Process)

Figure 14:
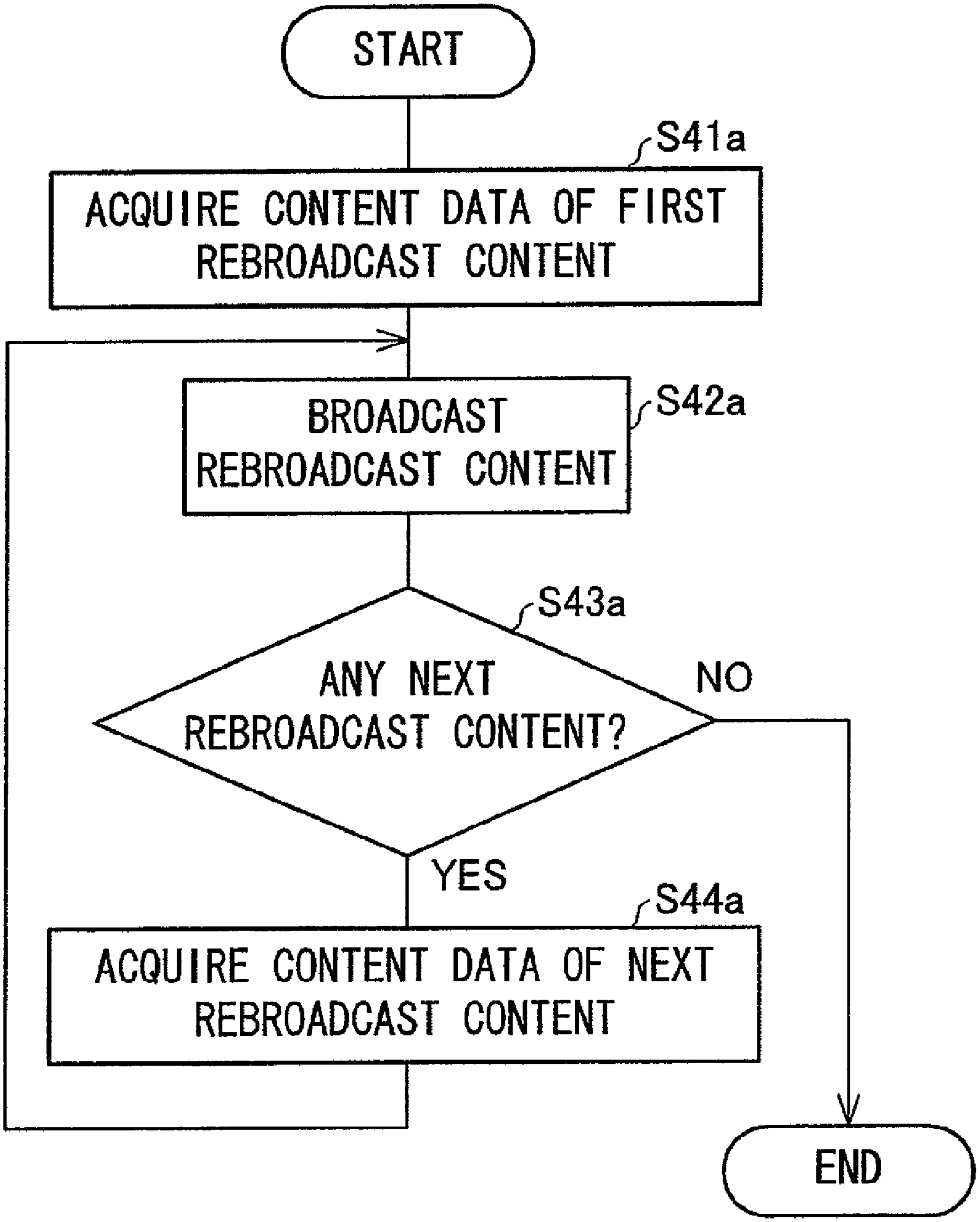
FIG. 14 is a flow chart illustrating a flow of broadcasting process of the rebroadcast content in the first embodiment.

Next, a flow of rebroadcast process of S12*a* is described below referring to a flow chart of FIG. 14. As described above, the scheduling for rebroadcast content is performed independently per broadcast area. Therefore, the broadcast process section 23 performs the rebroadcast process per broadcast area. Because the flow of the rebroadcast process is similar for every broadcast area, rebroadcast process for the broadcast area A is explained below.

To begin with, the broadcast process section 13 reads out, from the EPG information storage section 12, the EPG information for rebroadcast channel for the broadcast area A. Then, the broadcast process section 13 reads out, from the content data storage section 11, the content data of content to be broadcasted at first according to the EPG information (S41*a*).

Next, the broadcast process section 13 converts the thus read-out content data into broadcast signals of the digital terrestrial television broadcasting, and then transmits the broadcast signal to the broadcast network (S42*a*).

Next, referring to the EPG information, the broadcast process section 13 judges whether or not there is content to be rebroadcasted next (S43*a*).

If there is content to be rebroadcasted next ("Yes" at S43*a*), the broadcast process section 13 reads out, from the content data storage section 11, the content data of the content to be rebroadcasted (S44*a*). Then, the process returnees to S42*a*. On the other hands, if there is no content to be rebroadcasted next ("No" at S43*a*), the process is terminated.

(Specific Example of Process)

A specific example of the scheduling process for rebroadcast content is explained below.

Figure 15:
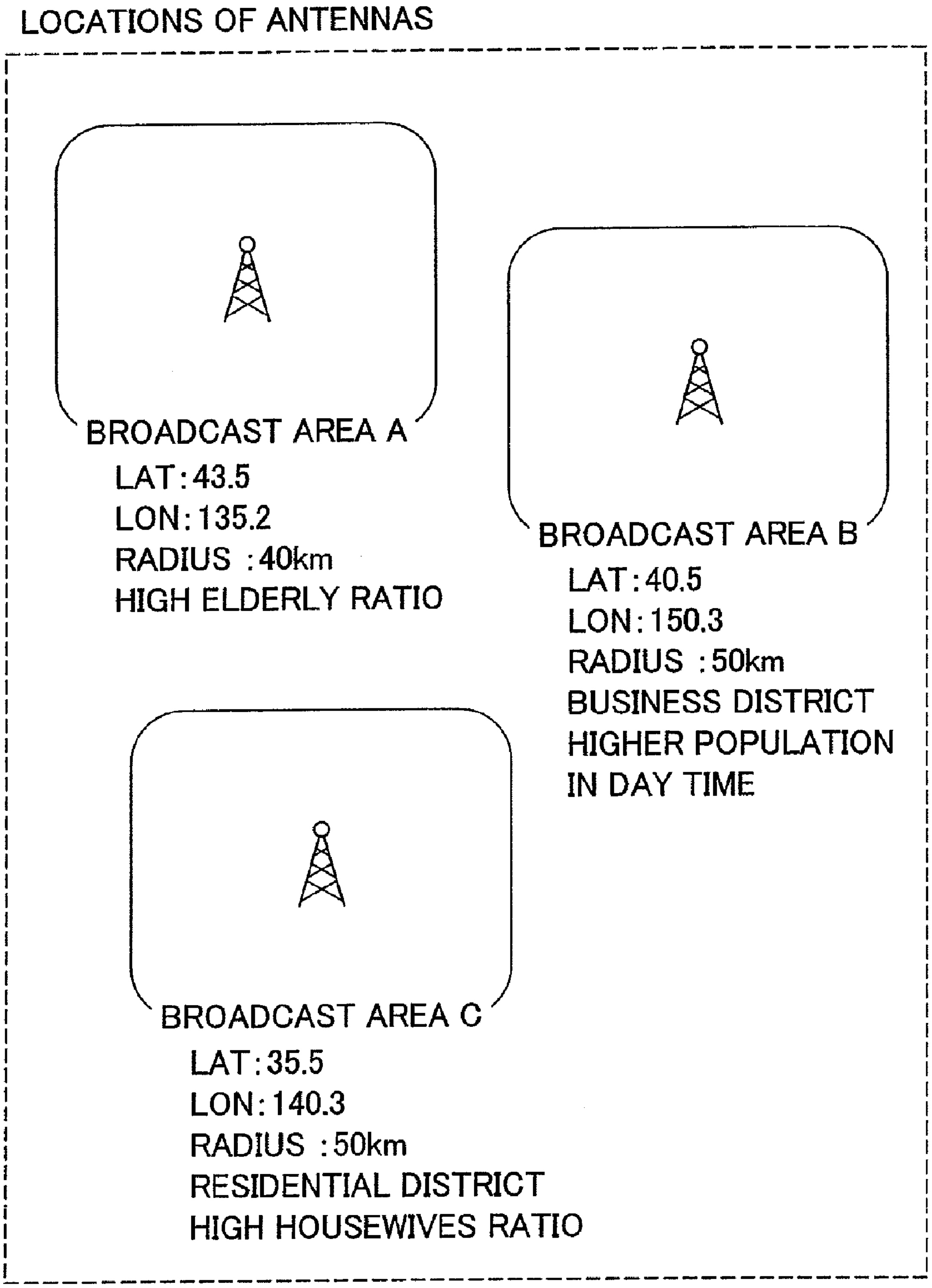
FIG. 15 is a view illustrating a specific example of a broadcast area.

To begin with, assumptions in the specific example are explained. FIG. 15 is a view illustrating population distributions in broadcast areas A, B, and C in the present example.

As illustrated in FIG. 15, the broadcast area A is an area in which elderly population is relatively high in ratio. The broadcast area B is a business district and a population of office workers is high in ratio in a day time. Furthermore, the broadcast area C is a residential district and a population of housewives is high in ratio in a day time.

Moreover, many office workers commute from the broadcast area C which is the residential district to the broadcast area B which is the business district.

Further, assume that the regular broadcast is performed for all the broadcast areas A, B, and C according to EPG information as illustrated in FIG. 4.

Moreover, assume that a broadcast antenna provided in a broadcast network of the broadcast area C breaks down at about 12:10, so that many reception defections are caused with respect to portable telephones 2 located in the broadcast area C at this time.

For example, at S21*a*, the summing section 18 detects that, according to the EPG information illustrated in FIG. 4, the content "Good Morning News" at the regular broadcast channel Ch1 and "Samurai Story" at the regular broadcast channel Ch2 are finished at 9:00. Further, the summing section 18 detects that content "Tabloid X" at the regular broadcast channel Ch1 is finished at 10:00.

Then, at S22*a*, the summing section 18 obtains defection counts for every content per broadcast area, and stores sum result information in the sum result storage section 19.

Assume that, at 11:00, the sum result storage section 19 stores sum result information as illustrated in FIG. 8.

In this case, the rebroadcast content scheduling section 20 performs the processes of S32*a* to 36*a* at 11:00. That is, from among the sum result information of the broadcast area A, the rebroadcast content scheduling section 20 extracts sum result information of the content name “Good Morning News” which satisfies the conditions A and B and has the largest defection counts. Similarly, from among sum result information of the broadcast areas B and C, the rebroadcast content scheduling section 20 extracts sum result information of the content name “Good Morning News”.

Then, the rebroadcast content scheduling section 20 reads out the content name “Good Morning News” from the thus extracted sum result information and determines to rebroadcast the content of the content name from 12:00 at rebroadcast channel Ch0 for all the broadcast areas.

Then, the rebroadcast content scheduling section 20 creates EPG information for the rebroadcast channel, as illustrated in FIG. 16.

Moreover, assume that, at 12:00, the sum result storage section 19 stores sum result information as illustrated in FIG. 17. At 11:00, the rebroadcast content scheduling section 20 deletes the sum result information of the content name “Good Morning News” that has been determined to be rebroadcasted.

In the present example, the broadcast area A in which the population of elderly is relatively high in ratio, the defection count of the content “Samurai Story”, which is popular among elderly people, is higher than those of the other content. On the other hand, in the broadcast area C in which the housewives population is high in ratio, the defection number of “Tabloid X”, which is popular among housewives, is higher than those of the other content.

In this case, at 12:00, the rebroadcast content scheduling section 20 extracts, from a sum result table of the broadcast area A, the sum result information of the content name “Samurai Story”, which satisfies the conditions A and B, and which has the largest defection count. Then, the rebroadcast content scheduling section 20 determines to rebroadcast the content of the extracted content name “Samurai Story” at the rebroadcast channel Ch0 from 13:00 in the broadcast area A. Then, the rebroadcast content scheduling section 20 creates EPG information for the rebroadcast channel for the broadcast area A, as illustrated in FIG. 18.

On the other hand, the rebroadcast content scheduling section 20 extracts, from the sum result information of the broadcast area C, the sum result information of the content name “Tabloid X” which satisfies the conditions A and B and which has the largest defection count. Then, the rebroadcast content scheduling section 20 determines to rebroadcast the content of the extracted content name “Tabloid X” at the rebroadcast channel Ch0 from 13:00 in the broadcast area C. Then, the rebroadcast content scheduling section 20 creates EPG information for the rebroadcast channel for the broadcast area C, as illustrated in FIG. 19.

The content name “Samurai Story” has a content length of 2 hours. Thus, rebroadcast finish time of the rebroadcast content for the broadcast area A is 15:00. Therefore, the rebroadcast content scheduling section 20 does not perform the scheduling for next rebroadcast content until 14:00 for the broadcast area A.

On the other hand, the content name ‘Tabloid X’ has a content length of one hour. Thus, rebroadcast finish time of the rebroadcast content for the broadcast area C is 14:00. Therefore, the rebroadcast content scheduling section 20 does not perform the scheduling for next rebroadcast content until 13:00 for the broadcast area C.

As described above, the rebroadcast content scheduling section 20 can determine which content to be rebroadcasted per broadcast area.

Further, assume that at 15:00, the sum result storage section 19 stores a sum result table for the broadcast area C as illustrated in FIG. 20. That is, in the broadcast area C in which the broadcast antenna broke down at 12:10, content “Friend of Housewives” and “News at Noon” broadcasted at 12:10 have high defection counts.

In this case, at 15:00, from among the sum result information of the broadcast area C, the rebroadcast content scheduling section 20 extracts sum result information of the content name “Friend of Housewives”, which satisfies the conditions A and B and which has a defection count greater than those of the other content. Then, the rebroadcast content scheduling section 20 determines to rebroadcast the content of the thus extracted content name “Friend of Housewives” at the rebroadcast channel Ch 0 from 16:00 in the broadcast area C. Accordingly, the rebroadcast content scheduling section 20 creates EPG information for the rebroadcast channel, as illustrated in FIG. 21.

(Display Process of EPG Information)

Figure 22:
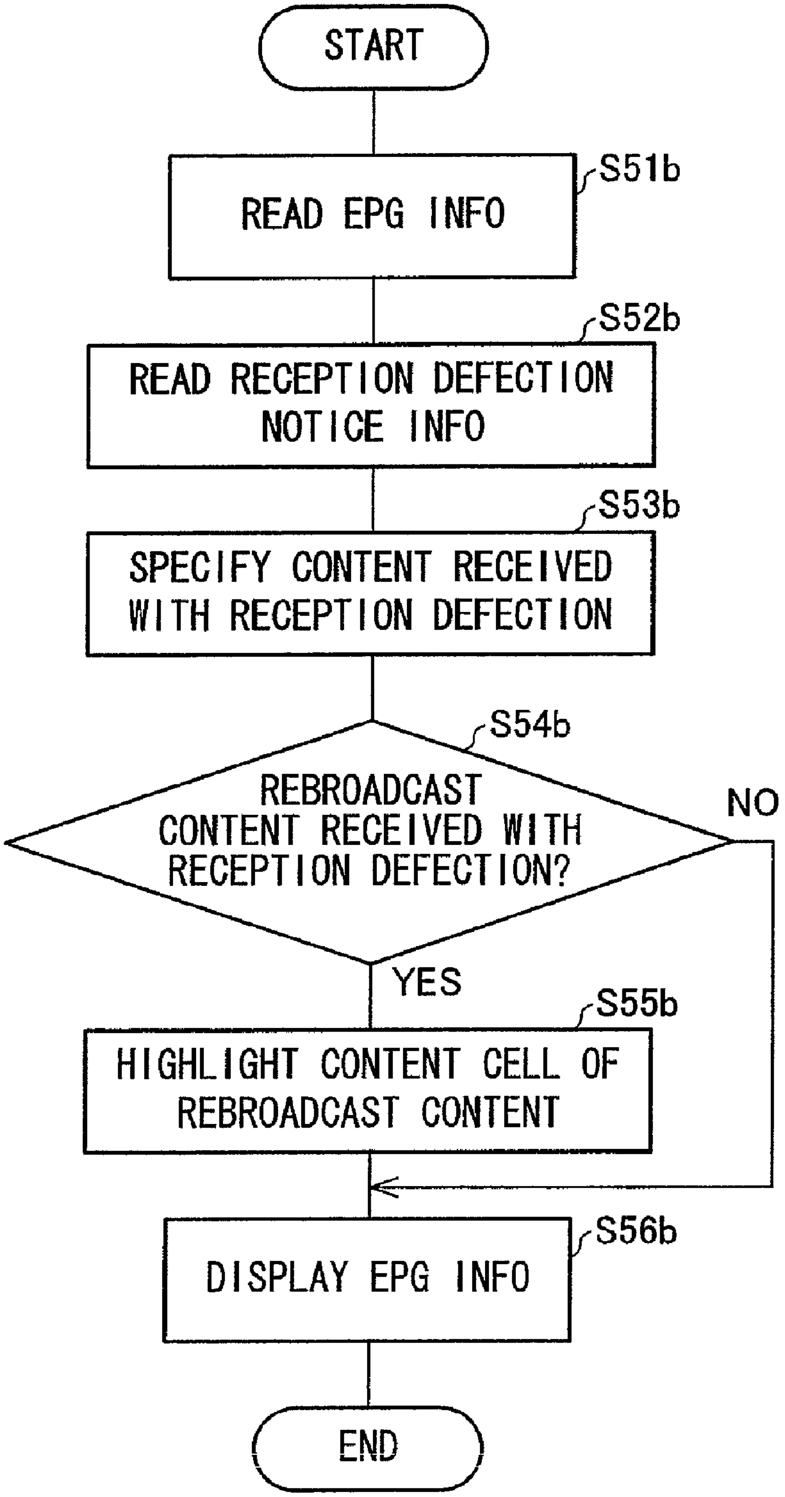
FIG. 22 is a flow chart illustrating a flow of process of an EPG information display process section of the portable telephone of the first embodiment 1.

Next, how the portable telephone 2 performs the display process of the EPG information is described below, referring to a flow chart of FIG. 22. The display process of the EPG information is started by input of an instruction to display EPG information display. The instruction is inputted into the operation section (not illustrated).

To begin with, the EPG information display process section 44 detects the input of the EPG information display instruction, and then reads out the EPG information for each channel from the EPG information storage section 43 (S51*b*).

Next, the EPG information display process section 44 reads out the reception defection notice information from the reception defection notice storage section 40 (S52*b*).

After that, from the EPG information, the EPG information display process section 44 specifies a content name of content broadcasted, at a channel indicated by the channel information of the reception defection notice information, at the reception defection occurrence time that corresponds to the channel information (S53*b*). For example, in case where the reception defection notice information indicates that the channel information “Ch 2” and reception defection occurrence time “12:10”, the EPG information display process section 44, referring to the EPG information illustrated in FIG. 4, specifies the content name “Friend of Housewives” of content broadcasted at the reception defection occurrence time at the channel indicated by the channel information.

After that, the EPG information display process section 44 judges whether or not the content of the content name specified at S53*b* is included in the EPG information for the rebroadcast channel (S54*b*).

If the content of the content name specified at S53*b* is included in the EPG information for the rebroadcast channel (S54*b*), the EPG information display process section 44 changes a color of that content cell in the EPG information for rebroadcast channel which corresponds to the content name specified at S53*b* (S55*b*). That is, the EPG information display process section 44 changes a display style of that content cell in the EPG information for rebroadcast channel which corresponds to the content name specified at S53*b*, so that this content cell is displayed differently from content cells that correspond to the other content.

After that, the EPG information display process section 44 causes the display section to display the EPG information thereon (S56*b*).

For example, in case the EPG information display process section 44 specifies the content name “Friend of Housewives” at S53*b*, the EPG information display process section 44 causes the display section 31 to display an EPG information screen as illustrated in FIG. 23, in which only the cell of the rebroadcast content "Friend of Housewives" for the rebroadcast channel is changed in color.

(Modification)

In the above explanation, right after the reception defection notice mail creating section 39 detects that the packet loss ratio detected by the reception defection detection section 37 becomes equal to or more than the predetermined value, the reception defection notice mail creating section 39 creates the reception defection notice mail and then the mail process section 41 transmits the reception defection notice mail.

In the above explanation, the transmission time of the reception defection notice mail is almost the same as the time (reception defection occurrence time) at which the reception defection occurred. Therefore, there is no problem to consider the transmission time of the reception defection notice mail as the reception defection occurrence time. However, to allow the broadcast station 1 to perform the summing more accurately, it is preferable that the reception defection notice mail creating section 39 reads reception defection occurrence time from the clock section (not illustrated), and the thus read reception defection occurrence time is included in the reception defection notice mail.

In this arrangement, referring to the reception defection occurrence time and the channel information included in the reception defection notice mail, the reception defection notice mail process section 16 specified, from the EPG information, the content name of the content that was being received at the time when the reception defection occurred.

Moreover, in the above explanation, the reception defection notice mail is created by the reception defection notice mail creating section 39 of the portable telephone 2 and transmitted every time the packet loss ratio detected by the reception state detection section 37 becomes equal to or more than the predetermined value.

However, the present invention is not limited to this. The present invention may be arranged such that the reception defection notice mail creating section 39 counts how many times (defection count) the packet loss ratio detected by the reception state detection section 3 becomes equal to or more than the predetermined value before an end of broadcast of content being currently received, and the reception defection notice mail creating section 39 then creates, after the end of the broadcast of the content, the reception defection notice mail that indicates the defection count.

More specifically, the reception defection notice mail creating section 39 reads out, from the EPG information stored in the EPG information storage section 43, broadcast finish time of the content that is currently being received. Then, the reception defection notice mail creating section 39 counts how many times the packet loss ratio detected by the reception state detection section 37 becomes equal to or more than the predetermined value before the end of the broadcast of the content being currently received. After the end of the broadcast of the content, the reception defection notice mail creating section 39 creates and transmits the reception defection notice mail that indicates a result of the counting.

In this arrangement, the reception defection notice mail creating section 39 reads, from the clock section (not illustrated), a time (reception defection occurrence time) at which the packet loss ratio becomes equal to or more than the predetermined value first with respect to this content. The reception defection notice mail includes, as in the above arrangement, the channel information and the positional information in addition to the defection count and reception defection occurrence time.

According to this arrangement, the reception defection notice mail creating section 39 of the portable telephone 2 is required to send the reception defection notice mail only once for the content of the broadcast signals that the portable telephone 2 receives. If the defection count is zero, the reception defection notice mail creating section 39 does not need to create the reception defection notice mail.

Moreover, in this arrangement, the reception defection notice mail process section 16 of the broadcast station 1 stores, in the reception defection list storage section 17, the defection count indicated by the mail. Meanwhile, referring to the reception defection occurrence time and the channel information included in the reception defection notice mail, the reception defection notice mail process section 16 specifies, from the EPG information, the content name of the content the portable telephone 2 was receiving when the reception defection occurred.

Then, the summing section 18 sums up the defection count in the reception defection mails for every content per broadcast area.

Moreover, in some cases, to count a number of portable telephones 2 in which the reception was defective is more preferable than to count the reception defection. In such a case, the reception defection notice mail creating section 39 may be arranged such that after the end of the broadcast of the content that the portable telephone 2 is currently receiving, the reception defection notice mail creating section 39 create the reception defection notice mail if the packet loss ratio detected by the reception state detection section 37 becomes equal to or more than the predetermined value at least once before the end of the broadcast of the content that the portable telephone 2 is currently receiving, the reception defection notice mail indicating the occurrence of the reception defection. With this arrangement, the reception defection notice mail creating section 39 transmits the reception defection notice mail only once, the reception defection notice mail indicating that the reception was defective. This allows the summing section 18 of the broadcast station 1 to sum up the number of portable telephones 2 in which the reception was defective.

Moreover, in the above explanation, the positional information acquiring section 38 acquires the positional information by using the GPS receiving device. However, the present invention is not limited to this and may be arranged such that the positional information acquiring section 38 acquires the positional information of the current position of the portable telephone 2 from base station information transmitted from a base station of the portable telephone 2. In this arrangement, the positional information is information that indicates the current position of the base station but not the position of the portable telephone 2, to say exactly. However, because a distance between the portable telephone 2 and the base station is relatively smaller than the broadcast area, there is no problem to consider (a) the positional information indicating the position of the base station as (b) the positional information of the current position of the portable telephone 2.

Moreover, in the above explanation, the broadcast station 1 rebroadcasts the content at the rebroadcast channel. However, the present invention is not limited to this and may be arranged such that the broadcast process section 13 specifies, referring the reception defection list storage section 17, a portable telephone 2 that transmitted the reception defection notice mail with respect to the rebroadcast content, and the content data of the rebroadcast content is transmitted to the thus specified portable telephone 2 in a pier-to-pier manner.

Moreover, the rebroadcast content scheduling section 20 of the broadcast station 1 may update the EPG information in the EPG information storage section 12 together with relationship information with respect to every content determined to be rebroadcasted. The relationship information indicates, as illustrated in FIG. 16, the cells of the content at the regular channel and at the rebroadcast channel are related with each other (the arrow in FIG. 16 is an example of the relation information). The broadcast process section 13 broadcasts with the broadcast signals to which the thus updated EPG information is added. Meanwhile, in the portable telephone 2, the EPG display process section 44 causes the display section 31 to display thereon the EPG information transmitted thereto. By doing this, a user can easily recognize which content will be rebroadcasted among content broadcasted at the regular broadcast channel.

Besides the relevant information of the arrow in FIG. 16, the rebroadcast content scheduling section 20 may use, e.g., relationship information that indicates the relationship by showing relevant cells in a color different from a color of the other cells.

As described above, the rebroadcast content scheduling system according to the present embodiment comprises a plurality of the portable telephones 2 and the broadcast station 1.

The portable telephone 2 comprises (a) the broadcast wave receiving section (receiving means) 35, (b) the reception state detection section (detection means) 37 for detecting the packet loss ratio (reception defection degree) of the broadcast wave received by the broadcast wave receiving section 35, (c) the reception defection notice mail creating section (reception state notifying means) 39 and the mail process section (reception state notifying means) 41 for transmitting to the broadcast station 1 the reception defection notice mail (reception state information) if the packet loss ratio detected by the reception state detection section 37 becomes equal to or more than the predetermined value (5%), the reception defection notice mail containing (a) the channel information that identifies the content of the broadcast wave that the broadcast wave receiving section 35 is receiving and (b) reception defection occurrence time (here, the transmission time is used in lieu) and indicating that the reception with respect to the content was defective.

According to this arrangement, the reception defection notice mail creating section 39 can judge whether or not the reception defection occurs, by checking whether or not the packet loss ratio detected by the reception state detection section 37 becomes more than 5%.

If the packet loss ratio detected by the reception state detection section 37 becomes more than 5%, the reception defection notice mail creating section 39 and the mail process section 41 transmits to the broadcast station 1 the reception defection notice mail, which contains the content identification information (channel information and the reception occurrence time (here, the transmission time is used in lieu) that identifies the content of the broadcast wave that the portable telephone 2 is receiving, that is, the content for which the reception defection occurs, and which indicates that the reception defection occurred with respect to the content.

With this arrangement, the broadcast station 1 can determine rebroadcast the content for which a large number of reception defection occurred. That is, the portable telephone 2 transmits the reception defection notice mail as a rebroadcast request. Therefore, without any manual operation by the user, the rebroadcast request is transmitted to the broadcast station 1 with respect to the content for which the reception defection occurs. Thus, the tedious manual operation to send the rebroadcast request becomes unnecessary. If the packet loss ratio detected by the reception state detection section 37 becomes more than 5%, the reception defection notice mail (rebroadcast request) is transmitted immediately. Therefore, for every content, the broadcast station 1 can sum up with respect to the reception defection notice mails immediately after the regular broadcast of the content is finished. As a result, a time between the end of the regular broadcast and the determination of the rebroadcast can be shortened.

The broadcast station 1 comprises (a) the communication section (communication means) 14 for receiving the reception defection notice mail, (b) the summing section 18 for summing the defection counts for every content by using the content identification information (channel information and broadcast time (here, the transmission time is used in lieu) contained in the reception defection notice mail received by the communication section 14, and (c) the rebroadcast content scheduling section (content scheduling means) 20 for determining which content is to be rebroadcasted, according to the sum result.

With this arrangement, the content is rebroadcasted according to the number of times the reception defection occurred. Therefore, it is possible to rebroadcast the content that the reception defection prevented many viewer/listener from watching/hearing.

The portable telephone 2 is provided with the positional information acquiring section (positional information acquiring means) 38 for acquiring the positional information that indicates the current position thereof. Furthermore, the reception defection notice mail creating section 39 causes the reception defection notice mail to contain the position information acquired by the positional information acquiring section 38.

Moreover, the broadcast station 1 is provided with the area information table storage section (broadcast area information storage section) 15 for storing therein the broadcast area identification information and the coverage area information in association with each other. The broadcast area identification information identifies the broadcast area. The coverage area information indicates the coverage is of the broadcast area. The reception defection notice mail process section (summing means) 16 specifies the coverage area information that covers the position indicated by the positional information contained in the reception defection notice mail transmitted thereto from the portable telephone 2. Then, the reception defection notice mail process section 16 reads out the broadcast area identification information that is in association with the thus specified coverage area information. Then, the summing section (summing means) 18 sums up the defection count for every content per broadcast area, by using the broadcast area identification information. Furthermore, the rebroadcast content scheduling section 20 determines which content is to be rebroadcasted per broadcast area according to the sum result calculated by the summing section 18.

As described above, for every broadcast area, which content is to be rebroadcasted can be determined by the broadcast station 1 according to occurrence of the reception defection among the viewers/listeners in a given broadcast area.

Moreover, from among pieces of the reception defection mail information corresponding to the reception defection notice mail, the rebroadcast notice mail process section (rebroadcast notice means) 21 of the broadcast station 1 extracts that reception defection mail information which contains the content identification information (here, content name) that is in association with the content that the rebroadcast content scheduling section 20 determined to be rebroadcasted. The rebroadcast notice mail process section 21 sends a notice to the electric mail address indicated by the thus extracted reception defection mail information, the notice notifying that the content is to be rebroadcasted.

With this arrangement, the portable telephone 2 can cause the display section 31 to display that the content the portable telephone 2 received with reception defection is to be rebroadcasted. With this, the viewer/listener does not miss a chance to watch/listen the rebroadcast content.

Moreover, the portable telephone 2 is provided with the EPG information storage section 43 for storing therein the EPG information that indicates the broadcast time of each content, and EPG display process section (EPG display process means) 44 for causing the display section (display device) 31 to display the EPG information.

The EPG display process section 44 matches (a) the EPG information of the content broadcasted at the channel of the channel information and at the reception defection occurrence time, against (b) the EPG information of the rebroadcast content, the channel information and the reception defection occurrence time being included in the reception defection notice information created by the reception defection notice mail creating section 39. Further, the EPG display process section 44 judges whether or not the content corresponding to the reception defection notice information is to be rebroadcasted. If the content is to be rebroadcasted, the EPG information of the content to be rebroadcasted is displayed in a display style different from the EPG information of the other EPG information. For example, the EPG display process section 44 may display the EPG information of the EPG information of the content to be rebroadcasted and the EPG information of the other content in different colors, or may add a mark of any kind to the EPG information of the content to be rebroadcasted.

With this, the viewer/listener can be easily notified that the content is to be rebroadcasted and of the broadcast time of the content to be rebroadcasted. As a result, the viewer/listener does not miss a chance to see/listen the rebroadcast content.

Second Embodiment

In the above embodiment, the broadcast station 1 performs the rebroadcast at the rebroadcast channel. In the present embodiment, there is no rebroadcast channel and the rebroadcast is performed at a regular broadcast channel. That is, a rebroadcast content scheduling system according to the present embodiment is arranged such that the rebroadcast is performed at the regular broadcast channel in a period of time in which no regular broadcast is performed (e.g., between 2:00 at night to 6:00 morning).

The second embodiment is described below, referring to FIGS. 24 to 26. For the sake of easy explanation, members respectively having the same functions as these illustrated in the drawings for the above embodiment is labeled in the same manner and their explanation is omitted here.

The rebroadcast content scheduling system according to the present embodiment is provided with a broadcast station 1 and a portable telephone 2, as in the above embodiment. The portable telephone 2 of the present embodiment has a similar configuration to that of the above embodiment illustrated in FIG. 3.

Unlike the above embodiment, the broadcast station 1 of the present embodiment schedules rebroadcast content according to the following conditions:

(e) the rebroadcast is performed at the regular broadcast channel in the period (from 2:00 AM to 6:00 AM) in which no regular broadcast is performed.

(f) which content is to be rebroadcasted from 2:00 AM to 6:00 AM is determined at 1:00 AM which is one hour before 2:00 AM.

(g) from among regular broadcast content whose broadcast is finished in a time period of from 1:00 AM to 2:00 AM on a preceding day and in a time period of from 6:00 AM on the preceding day to 1:00 AM on a current day, content to be rebroadcasted is selected based on defection count and rebroadcasted from 2:00 AM to 6:00 AM on the current day.

The broadcast station 1 of the present embodiment has a configuration similar to that of the above embodiment illustrated in FIG. 1. However, a summing section and a rebroadcast content scheduling section 20 of the broadcast station 1 of the present embodiment are different from those in the above embodiment and have the following functions.

As in the above arrangement, the summing section 18 of the present embodiment counts reception defection mail information including the same broadcast area identification information and content name from among the reception defection mail information stored in the reception defection list storage section 17, thereby obtain defection count. The defection count is regarded as refection defection count.

However, for every broadcast area the summing section 18 of the present embodiment stores, in the sum result storage section 19, the content names and their reception defection count in association with each other in the following manner.

The summing section 18 reads out, from the EPG information storage section 12, broadcast start time and broadcast finish time of the content identified with the content name. Then, the summing section 18 calculates out a content length of each content from the thus read-out broadcast start time and broadcast finish time. Then, for every content, the summing section 18 stores sum result information of the content in the sum result storage section 19, the sum result information indicating the content name, thus counted defection count, and thus calculated content name of the content.

FIG. 25 is a view illustrating an example of sum result information of a broadcast area A, the sum result information stored in the sum result storage section 19 according to the present embodiment. As illustrated in FIG. 25, for every content, the sum result storage section 19 stores the sum result information thereof, the sum result information indication content name, defection count, and content length thereof in association with each other.

Moreover, as in the above embodiment, for every broadcast area, the rebroadcast content scheduling section 20 of the present embodiment determines, referring to the sum result information of the respective broadcast areas, which content (rebroadcast content) is to be rebroadcasted and a broadcast start time of the rebroadcast content.

However, the rebroadcast content scheduling section 20 of the present embodiment performs the scheduling process of the rebroadcast content in the following manner.

After detecting that it becomes 1:00 AM, the rebroadcast content scheduling section 20 reads out the sum result information of the content broadcasted at the respective regular broadcast channels per broadcast area.

Next, the rebroadcast content scheduling section 20 reads out the content name and content length from the sum result information that has the largest defection count. Then, the rebroadcast content scheduling section 20 determines whether or not the read-out content length is equal to or less than a period for which no rebroadcast content has been set yet, within the rebroadcast period (from 2:00 AM to 6:00 AM). (Here, because any rebroadcast content has not been set, the rebroadcast period for which no rebroadcast content has been set yet is from 2:00 AM to 6:00 AM). If the content length is equal to or less than the period, the rebroadcast content scheduling section 20 determines to rebroadcast the content of the content name thus read out from the sum result information.

For example, assume that the sum result storage section 19 stores sum result information as illustrated in FIG. 25. In this case, the rebroadcast content scheduling section 20 reads out a content name "Good Morning News" and a content length "one hour" from the sum result information that has the largest defection count. Because the rebroadcast content scheduling section 20 determines to rebroadcast the content "Good Morning News" from 2:00 AM because the content length "one hour" is equal to or less than the period (from 2:00 AM to 6:00 AM) in which no rebroadcast content has not been set.

After that, the rebroadcast content scheduling section 20 reads out the content name and the content length from the sum result information that has the next largest defection count, and performs similar process.

For example, assume that the summing result information storage section stores the sum result information as illustrated in FIG. 25. In this case, the rebroadcast content scheduling section 20 reads content name "Samurai Story" and content length "two hours" from the sum result information that has the second largest defection count. Because the content length "two hours" is equal to or less than the period (from 3:00 AM to 6:00 AM) in which no rebroadcast content has been set, the rebroadcast content scheduling section 20 determines to rebroadcast the content "Samurai Story" from 3:00 AM.

In this way, the rebroadcast content scheduling section 20 reads out the content name and content length from the sum result information in a descending order of the defection count. Then, the rebroadcast content scheduling section judges whether the read-out content length is equal to or less than the period in which no rebroadcast content is set, the period being within the rebroadcast period (from 2:00 AM to 6:00 AM). If the content length is equal to or less than the period, the rebroadcast content scheduling section 20 determines to rebroadcast the content.

For example, if the sum result storage section 19 stores the sum result information as illustrated in FIG. 25, the rebroadcast content scheduling section 20 schedules the rebroadcast content as illustrated in FIG. 26.

Third Embodiment

In the above embodiments, the portable 2 detects that the packet loss ratio is equal to or more than the predetermined value, and then transmits the reception defection notice mail to the broadcast station 17 the reception defection notice mail notifying that the reception defection occurred. Then, the broadcast station 1 sums up the reception defection notice mail and schedules the rebroadcast content.

In a present embodiment, a portable telephone transmits a packet loss ratio to a broadcast station, and the broadcast station sums up the packet loss ratio thus received from the portable telephone and schedules rebroadcast content.

The third embodiment is described below referring to FIGS. 27 to 31. For the sake of easy explanation, members respectively having the same functions as those illustrated in the drawings explained in the previous embodiments are labeled in the same manner and their explanation is omitted here.

Figure 27:
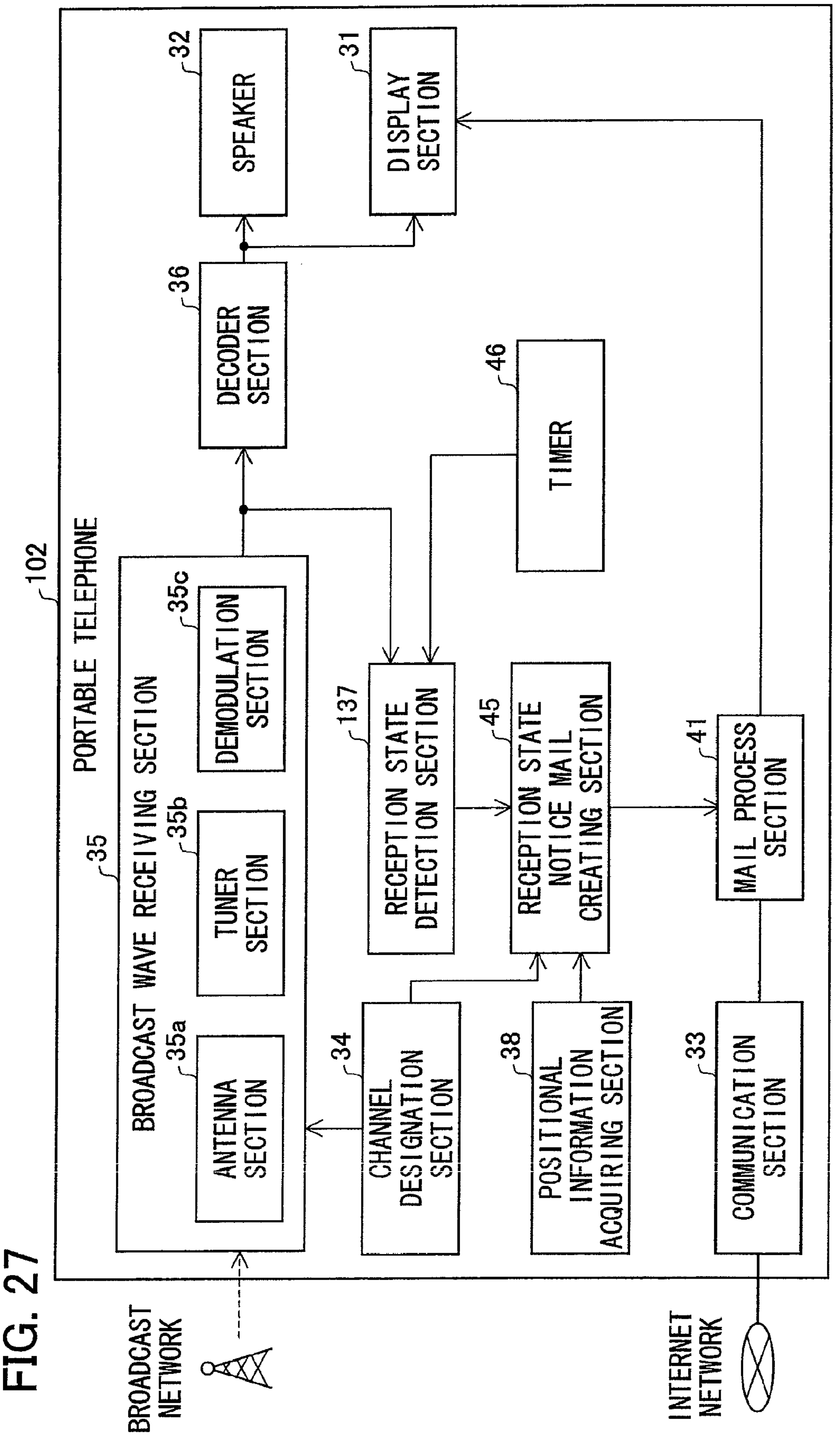
FIG. 27 is a block diagram illustrating a configuration of a portable telephone of a third embodiment.

FIG. 27 is a block diagram illustrating a configuration of a portable telephone 102 according to the present embodiment. As illustrated in FIG. 27, the portable telephone 102 is different from the portable telephone 2 in that the portable telephone 102 is provided with (a) a reception state detection section 137 in lieu of the reception state detection section 37, (b) a reception state notifying mail creating section (reception state notifying means) 45 in lieu of the reception defection notifying mail creating section 39, and (c) a timer 46 in addition.

The reception state detection section 137 measures the packet loss ratio periodically (e.g. every ten minutes) in sync with the timer 46. Then, the reception state detection section 137 outputs a result of the measurement to the reception state notifying mail creating section 45.

After receiving the packet loss ratio from the reception state detecting section 137, the reception state notifying mail creating section 45 acquires positional information from a positional information acquiring section 38, and acquires channel information from a channel designating section 34. The channel information indicates a channel that is currently designated. Then, the reception state notice mail generating section 45 creates a reception state notice mail that is for notifying the packet loss ratio, positional information, and the channel information. After that, the reception state notice mail generating section 45 transmits the thus created reception state notice mail to the mail creating section 41.

Figure 28:
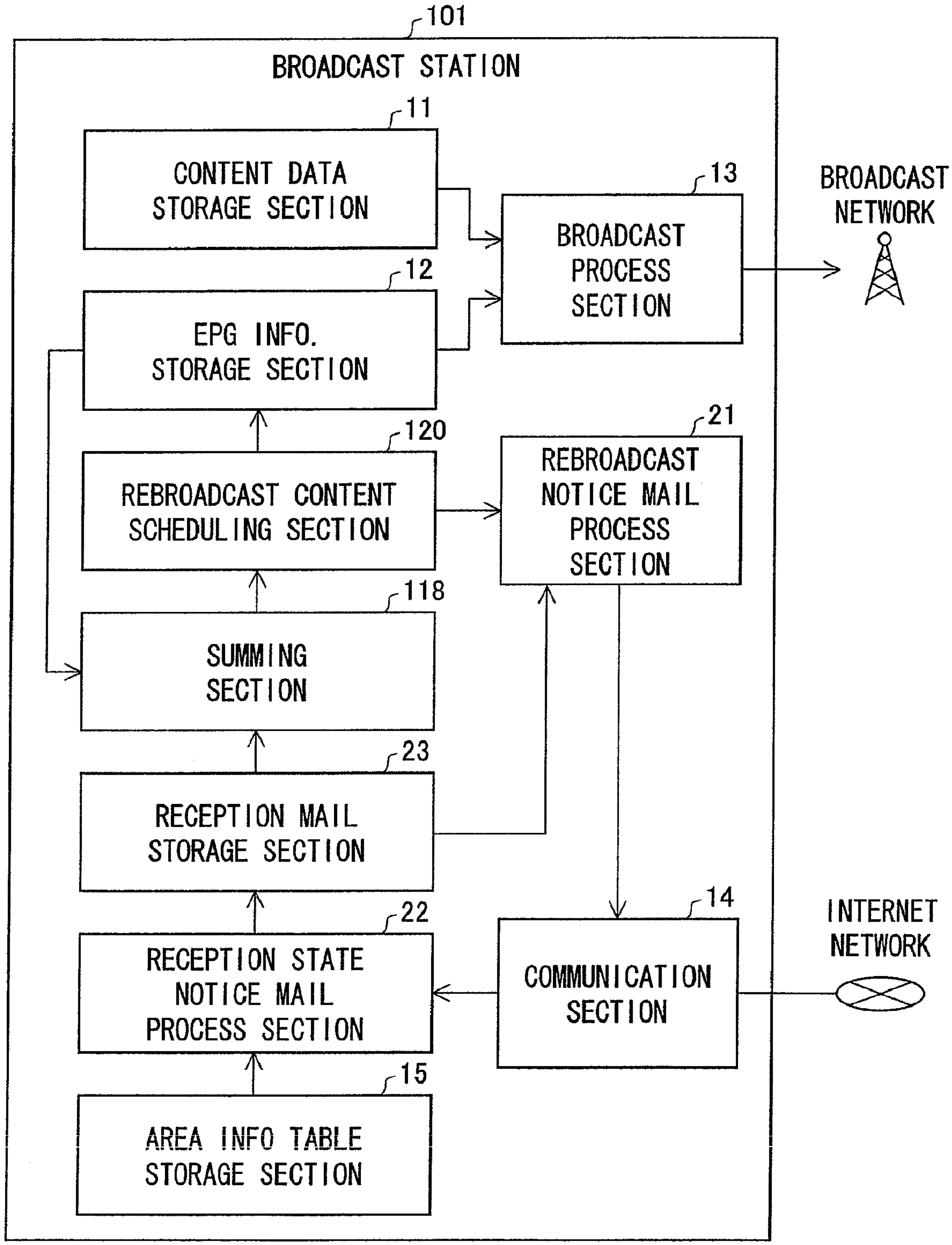
FIG. 28 is a block diagram illustrating a configuration of a broadcast station in the third embodiment.

FIG. 28 is a block diagram illustrating a configuration of a broadcast station 101 according to the present embodiment. As illustrated in FIG. 28, the broadcast station 101 is provided with a content data storage section 11, an EPG information storage section 12, a broadcast process section 13, a communication section 14, an area information table storage section 15, a reception state notice mail process section (summing means) 22, a reception mail storage section 23, a summing section (summing means) 118, a rebroadcast content scheduling section 120, and a rebroadcast notice mail process section 121.

The reception state notice mail process section 22 stores, in the reception mail storage section 23, reception mail information that is indicated by reception state notice mail forwarded thereto from the communication section 14.

More specifically, the reception state notice mail process section 22 extracts, from a reception defection notice mail forwarded thereto from the communication section 14, an electronic mail address, positional information, channel information, transmission time, and the packet loss ratio, of a sender of the reception defection notice mail (here, the transmission time is almost the same as detection time of the packet loss ratio).

Further, the reception state notice mail process section 22 reads out, from the area information table storage section 15, broadcast area identification information that is in association with the positional information thus extracted. Then, the reception state notice mail process section 22 creates reception mail information and stores the reception mail information in the reception mail storage section 23. The reception mail information indicates, in association with each other, the electric mail address, transmission time, channel information, and packet loss ratio (which are extracted from the reception state notice mail), and the broadcast area identification information thus read out from the area information table storage section 15.

Figures 30, 31, 32:
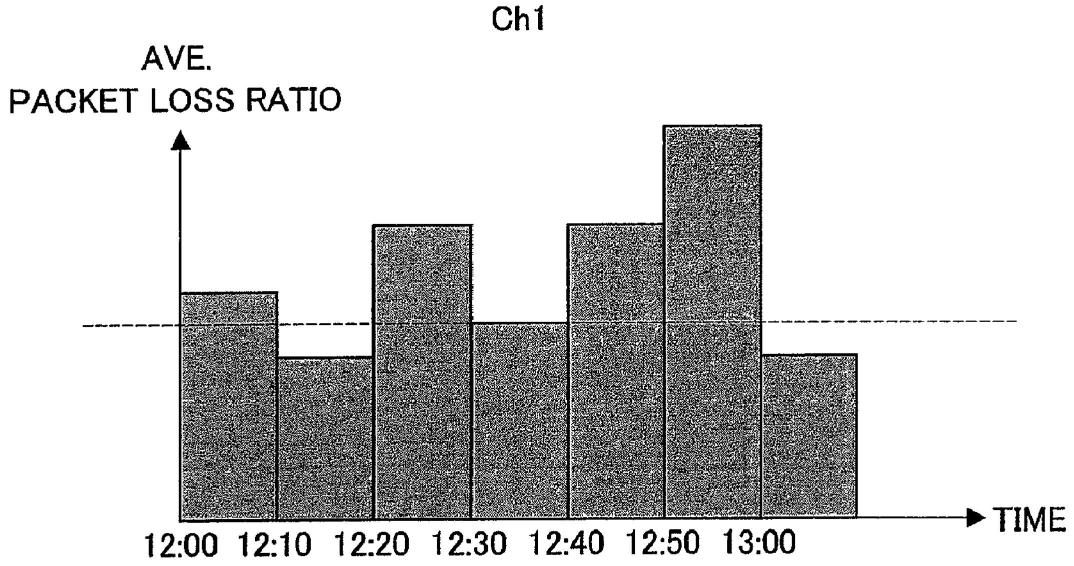
FIG. 30 is a view illustrating a change in an average packet loss ratio against time, the average packet loss ratio being worked out from a sum obtained by a summing section of the third embodiment 3.
FIG. 31 is a view illustrating an example of reception mail information that a received mail storage section of the third embodiment stores therein.
FIG. 32 is a view illustrating an example of EPG information of a piece of rebroadcast content in the third embodiment.

The reception mail storage section 23 is configured to store the reception mail information therein. FIG. 31 is a view illustrating an example of reception mail information stored in the reception mail storage section 23.

Referring to the reception mail information stored in the reception mail storage section 23, the summing section 118 calculates out an average of the packet loss ratios for every broadcast area, transmission time, and channel.

More specifically, the summing section 118 calculates out the average of packet loss ratios as follows. From among the reception mail information in the reception mail storage section 23, the summing section 118 calculates an average (average packet loss ratio) of the reception mail information whose transmission time is within a given broadcast time range (e.g., from 6:00 to 6:10) and which has the same broadcast area identification information and channel information.

Based on the average packet loss ratio thus calculated out by the summing section 118, the rebroadcast content scheduling section 120 determines which broadcast signals are to be rebroadcasted.

More specifically, if the average packet loss ratio thus calculated out by the summing section 118 is equal to or more than a given value (e.g., 5%), the rebroadcast content scheduling section 120 acquires, from the summing section 118, the channel information, broadcast area identification information, and broadcast time range that correspond to the average packet loss ratio.

Then, by the rebroadcast content scheduling section 120, the broadcast signals that was broadcasted in the broadcast time range at the channel indicated by the channel information is determined to be rebroadcasted in the broadcast area indicated by the broadcast area indicated by the broadcast area identification information.

Moreover, according to contents of the determination, the rebroadcast content scheduling section 120 updates EPG information stored in the EPG information storage section 12.

Further, the rebroadcast content scheduling section 120 outputs rebroadcast signal information, rebroadcast start time, and rebroadcast area information to the rebroadcast notice mail process section 121. The rebroadcast signal information indicates the channel and broadcast time range at/in which the broadcast signals determined to be rebroadcasted was broadcasted. The rebroadcast area information indicates a rebroadcast area (area in which the broadcast signals are to be rebroadcasted).

The rebroadcast notice mail process section 121 creates a rebroadcast notice mail. By the rebroadcast notice mail, the portable telephone 2 that was receiving the broadcast signals via regular broadcast is notified that the broadcast signals are to be rebroadcasted. Further, the rebroadcast notice mail process section 121 transmits the thus created rebroadcast notice mail to the portable telephone 2 via the communication section 14.

More specifically, the rebroadcast notice mail process section 121 specifies the reception mail information that has (i) the same channel information and the broadcast area identification information as the channel information and the broadcast area identification information indicated by the rebroadcast signal information transmitted thereto from the rebroadcast content scheduling section 120, and (ii) the transmission time that is within the broadcast time range indicated by the rebroadcast transmission signal information. Then, the rebroadcast notice mail process section 121 reads out an electronic mail address from the thus specified reception mail information, and creates the rebroadcast notice mail addressed to the thus read-out electronic mail address. The rebroadcast notice mail notifies that the broadcast signals determined, by the rebroadcast content scheduling section 120, to be rebroadcasted are broadcasted at a rebroadcast start time notified from the rebroadcast content scheduling section 120.

(Flow of Process of Rebroadcast Content Scheduling System)

Figure 29:
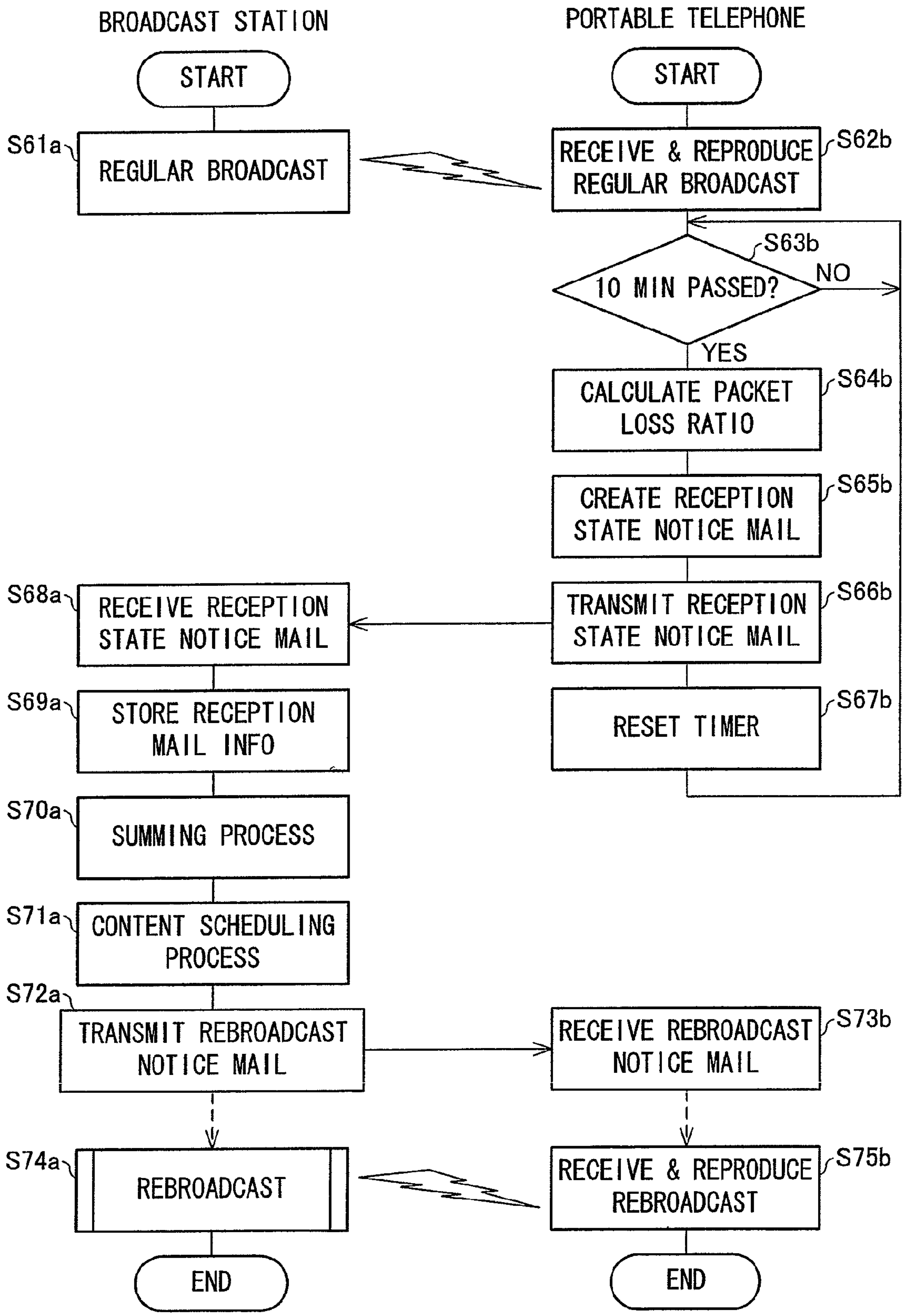
FIG. 29 is a flow chart illustrating a flow of whole process of rebroadcast content automatic scheduling system of the third embodiment.

Next, a flow of the process of the rebroadcast content scheduling system of the present embodiment is described below referring to a flow chart of FIG. 29.

To begin with, in the broadcast station 101, the broadcast process section 13 performs regular broadcast at a regular broadcast channel according to the EPG information stored in the EPG information storage section 12 (S61*a*).

Meanwhile, in the portable telephone 102, the broadcast wave receiving section 35 receives the broadcast signals and a decoder section 36 performs reproduction according to the broadcast signals (S62*b*). Meanwhile, the tuner section 35*b* notifies the reception state detection section 37 of an electric field intensity of the received signal, and a demodulation section 35*c* notifies the reception state detection section 37 of a C/N ratio of the received signal.

Next, referring to the timer 46, the reception state detection section 37 judges whether a given time period (e.g. 10 minutes) is elapsed or not (S63*b*).

If the given time has not been elapsed ("No") at S63*b*), the process returns to S63*b*.

On the other hand, if the given time has been elapsed ("Yes" at S63*b*), the reception state detection section 37 calculates the packet loss ratio from the electric field intensity notified from the tuner section 35*b* and the C/N ratio notified from the demodulation section 35*c* (S64*b*).

Then, the reception state notice mail creating section 45 acquires current positional information from the positional information storage section 38, the channel information from the channel designating section 34, the channel information indicating the channel that is currently designated. Then, the reception state notice mail generating section 45 creates the reception state notice mail (S65*b*). The reception state notice mail notifies the thus acquired positional information and channel information, the packet loss ratio thus measured by the reception state detection section 37, and a measuring time at which the packet loss ratio is calculated out. Here, the reception state notice mail creating section 45 creates and transmits the reception state notice mail at almost the same time the packet loss ratio is measured. Therefore, in the present embodiment, the transmission time of the reception state notice mail is regarded as indicating the measuring time at which the packet loss ratio is measured.

After that, the mail process section 41 transmits, to the broadcast station 1, the reception defection notice mail thus created by the reception state notice mail creating section 39 (S66*b*). Then, the reception state notice mail creating section 39 resets the timer 46 (S67*b*).

Next, in the broadcast station 1, the communication section 14 receives the reception state notice mail from the portable telephone 2 (S68*a*).

After that, the reception state notice mail process section 22 extracts, from the reception state notice mail, the electronic mail address, positional information, channel information, transmission time, and the packet loss ratio, of the sender of the reception state notice mail (here, the transmission time indicates the measuring time of the packet loss ratio). Then, the reception state notice mail process section 22 reads out, from the area information table storage section 15, the broadcast area identification information that is in association with the coverage area information regarding the coverage area that covers the position the thus extracted positional information regards.

Then, the reception state notice mail process section 22 creates the reception mail information and stores it in the reception mail storage section 23 (S69*b*). The reception mail information indicates, in association with each other, the electronic mail address, transmission time, channel information, and packet loss ratio, which are thus extracted from the reception state notice mail, and the broadcast area identification information that is in association with the positional information thus extracted from the broadcast area identification information.

Then, every predetermined broadcast time range, the summing section 118 extracts the reception mail information whose transmission time is within the broadcast time range, from among the reception mail information stored in the reception mail storage section 23. Next, from the thus extracted reception mail information, the summing section 118 calculates out the average (average packet loss ratio) of the packet loss ratios for every broadcast area and channel (S70*b*).

FIG. 30 is a view illustrating average packet loss ratios calculated out by the summing section 118 from the reception state notice mails transmitted from the portable telephones 102, with respect to broadcast signals broadcasted at channel Ch1 from 12:00 to 13:00.

As illustrated in FIG. 30, the packet loss ratio is equal to or more than the predetermined value (5%) at the time ranges from 12:00 to 12:10, and from 12:20 to 13:00.

So, the rebroadcast content scheduling section 120 acquires, from the summing section 118, the channel information (e.g., "Ch 1") of the reception mail information, the broadcast area identification information (e.g., "broadcast area A"), and the broadcast time range (e.g., "12:00 to 12:10"), which are in association with the average packet loss of 5% or more. Then, the rebroadcast content scheduling section 120 determines to rebroadcast the broadcast signals in the broadcast area at the channel, which is indicated by the channel information, the area information being indicated by the broadcast identification information, and the broadcast signals being broadcasted in the broadcast time range (S71*b*).

For example, in case where average packet loss ratios as illustrated in FIG. 31 are calculated out by the summing section 118, the rebroadcast content scheduling section 120 determines to rebroadcast, sequentially from 2:00 which is in a rebroadcast time range, the broadcast signals broadcasted in the broadcast time ranges in which the average packet loss ratio was 5% or more (namely 12:00 to 12:10, 12:20 to 12:30, and so on), as illustrated in FIG. 32.

Meanwhile, the rebroadcast content scheduling section 120 outputs the rebroadcast area information to the rebroadcast notice mail process section 121. The rebroadcast area information indicates the channel and the broadcast time range at/in which the broadcast signals determined to be rebroadcasted were broadcasted, the rebroadcast start time, and the broadcast area in which the broadcast signals are to be broadcasted.

Next, from among the reception mail information stored in the reception mail storage section 23, the rebroadcast notice mail process section 121 specifies the reception mail information that has the same channel information and the broadcast area identification information as the channel information and the rebroadcast area information indicated by the broadcast signal information received from the rebroadcast content scheduling section 120, and whose transmission time is within the broadcast time range indicated by the broadcast signal information.

Then, the rebroadcast notice mail process section 121 reads out the electronic mail address from the thus specified reception mail information. Next, the rebroadcast notice mail process section 121 transmits the rebroadcast notice mail to the thus read-out electronic mail address (S72*a*). The rebroadcast notice mail notifies that the broadcast signals determined, by the rebroadcast content scheduling section 120, to be rebroadcasted are to be broadcasted at the broadcast start time notified from the rebroadcast content scheduling section 120.

Then, the mail process section 41 of the portable telephone 102 receives the rebroadcast notice mail and causes the display section 31 to display the rebroadcast notice mail thereon (S73*b*).

After that, the broadcast process section 13 performs the rebroadcast, based on the EPG information for the rebroadcast channel updated by the rebroadcast content scheduling section 120 (S74*a*). Moreover, the portable telephone 102 receives and reproduces the broadcast signals for the rebroadcast content (S75*b*).

In the above explanation, the summing section 118 calculates out the average of the packet loss ratios indicated by the reception state notice mails from the portable telephone 102. Then, depending on whether the average packet loss ratio is equal to or more than the predetermined value, the rebroadcast content scheduling section 120 determines whether to rebroadcast the broadcast signals broadcasted in the broadcast time range.

However, the summing section 118 may be arranged such that, for every broadcast area and predetermined broadcast time range, the summing section 118 counts up the reception state notice mail that indicates the packet loss ratio equal to or more than the predetermined value. The rebroadcast content scheduling section 120 may be arranged such that the broadcast signals broadcasted in the broadcast time range with higher defection count is rebroadcasted first.

As described above, in the third embodiment, the portable telephone 102 is provided with the broadcast wave receiving section 35, the reception state detection section (detection means) 137 for measuring the packet loss ratio, and the reception state notice mail creating section (reception state notice means) 45 and mail process section (reception state notice means) 41 for transmitting the reception state notice mail to the broadcast station 101 every 10 minutes, the reception state notice mail containing the content identification information (channel information and packet loss ration measuring time (here, the transmission time is used in lieu)) for identifying the content represented by the broadcast wave that the portable telephone 102 is receiving, and indicating the packet loss ratio.

Moreover, the broadcast station 101 is provided with (a) the communication station 14 for receiving the reception state notice mail, (b) the summing section (summing means) 118 for summing up the characteristic amount for every content by using the content identification information included in the reception state notice mail, the characteristic amount regarding the packet loss ratio indicated by the reception state notice mail, and (c) the rebroadcast content scheduling section (content scheduling means) 120 for determining, based on the result of the summing, which content is to be rebroadcasted.

Here, as described above, the summing section 118 calculates the average of the packet loss ratios indicated by the reception state notice mails from a plurality of portable telephones 102, and the average is regarded as the characteristic amount. In an alternative, the summing section 118 counts the reception state notice mails that indicate packet loss ratios more than 5%, and the count is regarded as the characteristic amount.

With these arrangements, the portable telephone 102 can transmit the reception state notice mail every 10 minutes and the broadcast station 101 sums up the reception state notice mail and determines which content is to be rebroadcasted. Therefore, without performing an operation for transmitting a rebroadcast request, the viewer/listener can watch/listen the rebroadcast of the content for which the reception defection occurred. Moreover, because the determination of the content to be rebroadcasted is made based on the reception state notice mail regarding the content that is currently being received, it is possible to shorten a time interval between the end of the regular broadcast and the determination on the rebroadcast.

In the first and second embodiments, the reception defection notice mail creating section 39 and the mail process section 41 notify, by electronic mail, that the reception defection occurred. Moreover, in the third embodiment, the reception state notice mail creating section 45 and the mail process section 41 notify, by electronic mail, of the information that indicates the measured packet loss ratio.

However, the present invention is not limited to this and the reception defection notice mail creating section 39 (or the reception state notice mail creating section 45) and the mail process section 41 may adopt another method to notify the broadcast station 1 or 101, by electronic mail, that the reception defection occurred (or of the information that indicates the measured packet loss ratio).

For example, Http communication is one option. That is, the broadcast station 1 or 101 is provided with an HTTP server. The reception defection notice mail creating section 39 (or the reception state notice mail creating section 45) and the mail process section 41 access to URL of the HTTP server. Here, the reception defection notice mail creating section 39 (or the reception state notice mail creating section 45) and the mail process section 41 includes, in URL thereof, the reception defection occurrence time (or measuring time of the packet loss ratio), channel, positional information, packet loss ratio, and electronic mail address of the portable telephone 2 or 102. http://www.hoge.com/unvisiblereport.cgi?lat=42.5&lon=1 35.9&cannel=1&level=12&date=2005_08_14_06:21:20&mai l=aaa@hoge.com With this arrangement, the reception defection notice mail process section 16 (or the reception state notice mail process section 22) of the broadcast station 1 or 102 can acquire, by cgi, the reception defection occurrence time (or measuring time of the packet loss ratio), channel, positional information, packet loss ratio, and electronic mail address of the portable telephone 2 or 102, as in the embodiments, Use of TCP or UDP communication is another option. That is, a unique protocol for TCP or UDP communication is implemented between the broadcast station 1 or 101 and the portable telephone 2 or 102 for transmission/reception of data such as below:

Lat=42.5
Lon=135.9
Channel=1
Level=12
Date=2005/08/14 06:21:20
Mail=aaa@hoge.com With this arrangement, the reception defection notice mail creating section 39 (or the reception state notice mail creating section 45) and the mail process section 41 can transmit, to the broadcast station 1, the reception defection occurrence time (or measuring time of the packet loss ratio), channel, positional information, packet loss ratio, and electronic mail address of the portable telephone 2 or 102.

Moreover, the reception defection notice mail creating section 39 (or the reception state notice mail creating section 45) and the mail process section 41 may be arranged such that the reception defection notice mail creating section 39 (or the reception state notice mail creating section 45) and the mail process section 41 transmits, to the broadcast station 1 or 101 via a base station of the portable telephone 2, data that indicates the reception defection occurrence time (or measuring time of the packet loss ratio), channel, positional information, packet loss ratio, and electronic mail address of the portable telephone 2 or 102.

In general, the portable telephone 2 or 102 regularly transmits a packet that notifies the base station of a cell in which the portable telephone 2 or 102 is currently located. The reception defection notice mail creating section 39 (or the reception state notice mail creating section 45) and the mail process section 41 includes the data in the packet, so that the base station receives the data from the portable telephone 2 and 102 and transmits the data to the broadcast station 1 or 101.

Each block of the portable telephone 2 and 102 and each block of the broadcast station 1 and 101 may be respectively realized by hardware logic or by software by using a CPU.

That is, the portable telephone 2/102 or the broadcast station 1/101 is provided with a CPU (Central Processing Unit) for executing a command from a control program that realizes the respective functions, an ROM (Read Only Memory) in which the program is stored, an RAM (Random Access Memory) for expanding the program therein, a storage device (recording medium) (such as memory or the like) for storing the program and various data.

The object of the present invention can be attained by supplying the portable telephone 2/102 or the broadcast station 1/101 with a computer-readable recoding medium in which a program code (executing program, intermediate code program, source program) of the control program (software for realizing the above-described functions) for the portable telephone 2/102 or the broadcast station 1/101, and causing a computer (or CPU or MPU) of the portable telephone 2/102 or the broadcast station 1/101 to read and execute the program code stored in the recording medium.

Specific examples of the storage medium include: tapes such as magnetic tapes and cassette tapes; magnetic disks such as floppy® disks and hard disks; optical disks such as CD-ROM, MO, MD, DVD, and CD-R; cards such as IC cards (memory cards) and optical cards; and semiconductor memories such as mask ROM, EPROM, EEROM, or flash ROM.

The portable telephones 2 and 102, the broadcast station 1 and 101 may be configured to be connectable to the communications network, and the program code may be supplied via the communications network. Examples of the communications network include, but are not limited to, the Internet, an intranet, an extranet, LAN, ISDN, VAN, CATV communications network, virtual private network, telephone line network, mobile communications network, and satellite communications network. The carrier medium for realizing the communications networks is not particularly limited. Specific examples include IEEE1394, USB, power line carrier, cable TV lines, telephone lines, ADSL lines, or other wired lines. Further, the carrier medium may be wireless lines, including IR rays such as IrDA or remote control, Bluetooth®, 802.11 wireless line, HDR, portable telephone lines, satellite connection, and terrestrial digital network. Note that, the present invention can also be realized in the form of a computer data signal conveyed by a carrier wave, whereby the program code is electrically transmitted.

As described above, a receiving device according to the present invention includes: receiving means for receiving a broadcast wave; detection means for detecting a reception defection degree in the reception of the broadcast wave; and reception state notifying means for transmitting reception state information to a rebroadcast content scheduling device if the reception defection degree detected by the detection means is larger than a predetermined value, the rebroadcast content scheduling device being for scheduling rebroadcast content, where the reception state information includes content identification information for identifying content represented by the broadcast wave received by the receiving means and indicates that the reception defection occurred in the reception of the content.

A reception state notifying method according to the present invention for a receiving device comprising receiving means, detection means, and reception state notifying means, is arranged to include: the receiving means receiving a broadcast wave; the detection means detecting a reception defection degree in the reception of the broadcast wave; the reception state notifying means transmitting reception state information to a rebroadcast content scheduling device if the reception defection degree detected by the detection means is larger than a given value, the rebroadcast content scheduling device being for scheduling rebroadcast content, where the reception state information includes content identification information for identifying content represented by the broadcast wave received by the receiving means and indicates that the reception defection occurred in the reception of the content.

Here, the reception defection degree may be any parameter that indicates a state of the reception. For example, electric field intensity of reception, C/N ratio, S/N ration, a packet loss ratio calculated out from such parameter. The content identification information may be any information that can identify the content. Examples of the content identification information encompass a content name, broadcast time and channel of the content, and the like information.

With this arrangement, the reception state communication means judges whether or not the reception defection degree detected by the detection means is more than the predetermined value, thereby to judge whether or not the reception defection occurred. If the reception defection degree detected by the detection means is more than the given value, the reception state notifying means transmits the reception state information to the rebroadcast content scheduling device, the reception state information including the content identification information that indicates the content represented by the broadcast wave, that is, the content being received with the reception defection, and indicating that the reception defection occurred in the reception of the content.

By doing this, the rebroadcast content scheduling device can determine to rebroadcast, as the rebroadcast content, the content that was received with many reception defections. That is, the receiving device transmits the reception state information as a rebroadcast request. Therefore, without any manual operation by a user, the rebroadcast request for the content received with the reception defection is transmitted to the rebroadcast content scheduling device. Therefore, the user does not need to perform tedious operation for rebroadcast request, unlike in the conventional arrangement.

Moreover, if the reception defection degree detected by the detection means is larger than the predetermined value, the reception state information is transmitted immediately. Therefore, for every content, the rebroadcast content scheduling device can sum up the reception state information regarding the content immediately after the end of regular broadcast of the content. As a result, it is possible to shorten the time between the end of the regular broadcast and the determination of the rebroadcast.

Moreover, a receiving device according to the present invention includes: receiving means for receiving a broadcast wave; detection means for detecting a reception defection degree in the reception of the broadcast wave, the reception defection degree indicating how sever reception defection is; and reception state notifying means for transmitting reception state information to a rebroadcast content scheduling device at a given timing, the rebroadcast content scheduling device being for scheduling rebroadcast content, where the reception state information includes content identification information for identifying content represented by the broadcast wave received by the receiving means and indicates the reception defection degree detected by the detection means.

A reception state notifying method according to the present invention for a receiving device comprising receiving means, detection means, and reception state notifying means, is arranged to include: the receiving means receiving a broadcast wave; the detection means detecting a reception defection degree in the reception of the broadcast wave, the reception defection degree indicating how sever reception defection is; and the reception state notifying means transmitting reception state information to a rebroadcast content scheduling device at a given timing, the rebroadcast content scheduling device being for scheduling rebroadcast content, where the reception state information includes content identification information for identifying content represented by the broadcast wave received by the receiving means and indicates the reception defection degree detected by the detection means.

With this arrangement, the rebroadcast content scheduling device can acquire, at the given timing from the receiving device, the reception defection degree and the content identification information that identifies the content being received. Therefore, for every content, the rebroadcast content scheduling device can grasp, at the given timing, a number such as how many receiving devices received the content with the reception defection. Therefore, the rebroadcast content scheduling device can determined, based on the number, which content is to be broadcasted. Therefore, without any manual operation of the user, the rebroadcast content scheduling device can determine to rebroadcast the content that was received with the reception defection. That is, the user does not need to perform tedious operation for rebroadcast request, unlike in the conventional arrangement.

Moreover, for every content, whether to rebroadcast the content can be determined by the rebroadcast content scheduling device, based on the reception state information for the content after the end of the regular broadcast. As a result, it is possible to shorten the time between the end of the regular broadcast and the determination of the rebroadcast.

In addition to the above arrangement, the receiving device according to the present invention may be arranged to include positional information acquiring means for acquiring positional information that indicates a current position, the reception state notifying means causing the reception state information to include the positional information acquired by the positional information acquiring means. This arrangement allows the rebroadcast content scheduling device to specify, for every broadcast area, which content is received with many reception defections. As a result, which content is to be rebroadcasted can be determined per broadcast area by the rebroadcast content scheduling device, according to the state of the reception defection among the viewers/listeners in the broadcast area.

Further, in addition to the above arrangement, the receiving device may be arranged to include an EPG information storage section for storing therein EPG information that indicates a broadcast time of each content; and EPG display process means for causing a display device to display the EPG information thereon, the EPG display process means matching (a) EPG information that is in association with given content indicated by the content identification information contained in the reception state information transmitted by the reception state notifying means, against (b) EPG information that is in association with the rebroadcast content, so as to judge whether or not the given content is to be rebroadcasted, and if the given content is to be rebroadcasted, the EPG display process means displaying the EPG information that is in association with the rebroadcast content corresponding to the given content in such a manner that the EPG information is displayed in a display style different from that of EPG information of the rest of the content.

With this arrangement, if the content received with reception defection is to be rebroadcasted, the viewer/listener can be easily notified of the rebroadcast of the content and the broadcast time of the rebroadcast. As a result, the viewer/listener does not miss a chance of watching/listening to the rebroadcast content.

Moreover, a rebroadcast content scheduling device according to the present invention includes: communication means for receiving reception state information transmitted from a receiving device, the receiving device detecting a reception defection degree in reception of a broadcast wave and transmitting the reception state information at a given timing, where the reception state information includes content identification information for identifying content represented by the broadcast wave received by the receiving device and indicates the reception defection degree; summing means for summing up a characteristic amount regarding the reception defection degree for every content by using the content identification information contained in the reception state information received by the communication means where the reception defection degree is indicated by the reception state information; and content scheduling means for determining, based on a result of the summing performed by the summing means, which content is to be rebroadcasted.

Furthermore, a rebroadcast content scheduling method according to the present invention for a rebroadcast content scheduling device comprising communication means, summing means, and content scheduling means, is arranged to include: the communication means receiving reception state information from a receiving device which detects a reception defection degree in reception of a broadcast wave and which transmits the reception state information at a given timing, where the reception state information includes content identification information for identifying content represented by the broadcast wave received by the receiving device and indicates the reception defection degree; the summing means summing up a characteristic amount regarding the reception defection degree for every content by using the content identification information included in the reception state information received by the communication means, where the reception defection degree is indicated by the reception state information; and based on a result of the summing performed by the summing means, the content scheduling means determining which content is to be rebroadcasted.

Here, as the characteristic amount, the summing means calculates, for example, an average of the reception defection ratios indicated by the reception state information from a plurality of the receiving devices. In an alternative, as the characteristic amount, the summing means calculates out a number of reception state information that indicates reception defection degrees larger than the predetermined value.

In this arrangement, the receiving state information is acquired from the plurality of receiving devices, the receiving state information (a) that includes the content identification information identifying the content represented by the broadcast wave that the receiving devices are receiving, and (b) that indicates the reception defection degree. With this arrangement, for every receiving device, the rebroadcast content scheduling device can grasp the content the receiving device is receiving and the reception defection degree in the reception of the content.

For every content, by using the content identification information, the summing means sums up the characteristic amount regarding the reception defection degree indicated by the reception state information. Further, based on the result of the summing, the content scheduling means determines which content is to be rebroadcasted. Therefore, which content is to be rebroadcasted can be determined considering the states of all the receiving devices.

As described above, the receiving device transmits the reception state information at the given timing and the rebroadcast content scheduling device, using the reception state information, determines which content is to be rebroadcasted. Because of this, without performing the manual operation for sending the rebroadcast request the viewer/listener can watch/listen the rebroadcast of the content that was received with the reception defection.

Moreover, which content is to be rebroadcasted is determined referring to the reception state information with respect to the content that is being received currently. Therefore, it is possible to shorten the time between the end of the regular broadcast and the determination of the rebroadcast.

Further, in addition to the above arrangement, the rebroadcast content scheduling device according the present invention may be arranged to include a broadcast area identification information storage section for storing therein broadcast area identification information and coverage area information in association with each other, the broadcast area identification information identifying a broadcast area and the coverage area information indicating a coverage area of the broadcast area, the communication means receiving positional information from the receiving device together with the reception state information, the positional information indicating a current position of the receiving device, the summing means (a) specifying the coverage area information that covers a position indicated by the positional information, (b) reading out, from the broadcast area identification information storage section, the broadcast area identification information that is in association with the thus specified coverage area information, and (c) summing up the characteristic amount for each content per broadcast area by using the thus read-out broadcast area identification information, and based on the result of the summing performed by the summing means, the content scheduling means determining, per broadcast area, which content is to be rebroadcasted.

With this arrangement, the rebroadcast content scheduling device can specify, per broadcast area, which content is received with many reception defections. As a result, which content is to be rebroadcasted can be determined for every broadcast area by the rebroadcast content scheduling device according to occurrence of the reception defection among the viewers/listeners per broadcast area.

Further, in addition to the above arrangement, the rebroadcast content scheduling device according to the present invention may be arranged to include rebroadcast notifying means for extracting, from among the reception state information received by the communication means, reception state information that includes content identification information of content that the content scheduling means determines to be rebroadcasted, and for notifying a receiving device that the content is to be rebroadcasted, the receiving device having transmitted the extracted reception state information to the rebroadcast content scheduling device.

This arrangement allows the receiving device to easily recognize whether or not the content received with the reception defection will be rebroadcasted. Because of this, the viewer/listener does not miss a chance to watch/listen the rebroadcast content.

A rebroadcast content scheduling system according to the present invention includes: reception devices for receiving a broadcast wave; and a rebroadcast content scheduling device, each of the receiving devices comprising: receiving means for receiving a broadcast wave; detection means for detecting a reception defection degree in the reception of the broadcast wave; and reception state notifying means for transmitting reception state information to a rebroadcast content scheduling device if the reception defection degree detected by the detection means is larger than a predetermined value, the rebroadcast content scheduling device being for scheduling rebroadcast content, where the reception state information includes content identification information for identifying content represented by the broadcast wave received by the receiving means and indicates that the reception defection occurred in the reception of the content, and the rebroadcast content scheduling device comprising: communication means for receiving the reception state information from the receiving device; summing means for counting up occurrence of reception defection for every content by using the reception state information received by the communication means and the content identification information included in the reception state information, where the reception defection is a state in which the reception defection degree in the reception device is larger than the given value; and content scheduling means for determining, based on a summing result of the summing means, which content is to be rebroadcasted.

With this arrangement, if the reception defection degree detected by the detection means is more than the given value, the reception state notifying means transmits the reception state information to the rebroadcast content scheduling device, the reception state information including the content identification information that indicates the content represented by the broadcast wave, that is, the content being received with the reception defection, and indicating that the reception defection occurred in the reception of the content. By doing this, the rebroadcast content scheduling device can determine to rebroadcast, as the rebroadcast content, the content that was received with many reception defections.

That is, the receiving device transmits the reception state information as a rebroadcast request. Therefore, without any manual operation by a user, the rebroadcast request for the content received with the reception defection is transmitted to the rebroadcast content scheduling device. Therefore, the user does not need to perform tedious operation for rebroadcast request, unlike in the conventional arrangement.

Moreover, if the reception defection degree detected by the detection section is larger than the predetermined value, the reception state information is transmitted immediately. Therefore, for every content, the rebroadcast content scheduling device can sum up the reception state information regarding the content immediately after the end of regular broadcast of the content. As a result, it is possible to shorten the time between the end of the regular broadcast and the determination of the rebroadcast.

In addition to the above arrangement, the rebroadcast content scheduling system according to the present invention may be arranged such that the receiving device comprises positional information acquiring means for acquiring positional information that indicates a current position, the reception state notifying means causing the reception state information to include the positional information acquired by the positional information acquiring means, the rebroadcast content scheduling device comprises a broadcast area identification information storage section for storing therein broadcast area identification information and coverage area information in association with each other, the broadcast area identification information identifying a broadcast area and the coverage area information indicating a coverage area of the broadcast area, the summing means (a) specifying the coverage area information that covers a position indicated by the positional information, (b) reading out, from the broadcast area identification information storage section, the broadcast area identification information that is in association with the thus specified coverage area information, and (c) summing up the count of the reception defection for each content per broadcast area by using the thus read-out broadcast area identification information, and based on the result of the summing performed by the summing means, the content scheduling means determining, per broadcast area, which content is to be rebroadcasted.

With this arrangement, the rebroadcast content scheduling device can specify, per broadcast area, which content is received with many reception defections. As a result, which content is to be rebroadcasted can be determined for every broadcast area by the rebroadcast content scheduling device according to occurrence of the reception defection among the viewers/listeners per broadcast area.

Further, in addition to the above arrangement, a rebroadcast content scheduling system according to the present invention may be arranged such that the rebroadcast content scheduling device comprises rebroadcast notifying means for extracting, from among reception state information received by the communication means, reception state information that includes content identification information associated with content that the content scheduling means determines to be rebroadcasted, and for notifying a receiving device that the content is to be rebroadcasted, the receiving device having transmitted the extracted reception state information to the rebroadcast content scheduling device.

This arrangement allows the receiving device to easily recognize whether or not the content received with the reception defection will be rebroadcasted. Because of this, the viewer/listener does not miss a chance to watch/listen the rebroadcast content.

Further, in addition to the above arrangement, a rescheduling content scheduling system according to the present invention may be arranged such that the receiving device comprises: an EPG information storage section for storing therein EPG information that indicates a broadcast time of each content; and EPG display process means for causing a display device to display the EPG information thereon, the EPG display process means matching (a) EPG information that is in association with given content indicated by the content identification information contained in the reception state information transmitted by the reception state notifying means, against (b) EPG information that is in association with the rebroadcast content, so as to judge whether or not the given content is to be rebroadcasted, and if the given content is to be rebroadcasted, the EPG display process means displaying the EPG information that is in association with the rebroadcast content corresponding to the given content in such a manner that the EPG information is displayed in a display style different from that of EPG information of the rest of the content.

With this arrangement, if the content received with reception defection is to be rebroadcasted, the viewer/listener can be easily notified of the rebroadcast of the content and the broadcast time of the rebroadcast. As a result, the viewer/listener does not miss a chance of watching/listening to the rebroadcast content.

Furthermore, a rebroadcast content scheduling system according to the present invention includes reception devices for receiving a broadcast wave; and a rebroadcast content scheduling device, each of the receiving devices comprising: receiving means for receiving a broadcast wave; detection means for detecting a reception defection degree in the reception of the broadcast wave, the reception defection degree indicating how sever reception defection is; and reception state notifying means for transmitting reception state information to a rebroadcast content scheduling device at a given timing, the rebroadcast content scheduling device being for scheduling rebroadcast content, where the reception state information includes content identification information for identifying content represented by the broadcast wave received by the receiving means and indicates the reception defection degree detected by the detection means, and the rebroadcast content scheduling device comprising: communication means for receiving the reception state information from the receiving device; summing means for summing up a characteristic amount for every content by using the content identification information included in the reception state information received by the communication means, the characteristic amount regarding a reception defection degree, where the reception defection degree is indicated by the reception state information, content scheduling means for determining, based on a summing result of the summing means, which content is to be rebroadcasted.

With this arrangement, the receiving device transmits the reception state information at the given timing and the rebroadcast content scheduling device, using the reception state information, determines which content is to be rebroadcasted. Because of this, without performing the manual operation for sending the rebroadcast request the viewer/listener can watch/listen the rebroadcast of the content that was received with the reception defection.

Moreover, which content is to be rebroadcasted is determined referring to the reception state information with respect to the content that is being received currently. Therefore, it is possible to shorten the time between the end of the regular broadcast and the determination of the rebroadcast.

In addition to the above arrangement, the rebroadcast content scheduling system according to the present invention may be arranged such that the receiving device comprises positional information acquiring means for acquiring positional information that indicates a current position, the reception state notifying means causing the reception state information to include the positional information acquired by the positional information acquiring means, the rebroadcast content scheduling device comprises a broadcast area identification information storage section for storing therein broadcast area identification information and coverage area information in association with each other, the broadcast area identification information identifying a broadcast area and the coverage area information indicating a coverage area of the broadcast area, the summing means (a) specifying the coverage area information that covers a position indicated by the positional information, (b) reading out, from the broadcast area identification information storage section, the broadcast area identification information that is in association with the thus specified coverage area information, and (c) summing up the count of the reception defection for each content per broadcast area by using the thus read-out broadcast area identification information, and based on the result of the summing performed by the summing means, the content scheduling means determining, per broadcast area, which content is to be rebroadcasted.

With this arrangement, the rebroadcast content scheduling device can specify, per broadcast area, which content is received with many reception defections. As a result, which content is to be rebroadcasted can be determined for every broadcast area by the rebroadcast content scheduling device according to occurrence of the reception defection among the viewers/listeners per broadcast area.

Further, in addition to the above arrangement, a rebroadcast content scheduling system according to the present invention may be arranged such that the rebroadcast content scheduling device comprises rebroadcast notifying means for extracting, from among reception state information received by the communication means, reception state information that includes content identification information associated with content that the content scheduling means determines to be rebroadcasted, and for notifying a receiving device that the content is to be rebroadcasted, the receiving device having transmitted the extracted reception state information to the rebroadcast content scheduling device.

This arrangement allows the receiving device to easily recognize whether or not the content received with the reception defection will be rebroadcasted. Because of this, the viewer/listener does not miss a chance to watch/listen the rebroadcast content.

Further, in addition to the above arrangement, the rebroadcast content scheduling system according to the present invention is arranged such that the content scheduling means determines which content is to be rebroadcasted at a channel for exclusive use in rebroadcasting.

The use of the channel for exclusive use in rebroadcasting makes it easy to schedule rebroadcast content, and increases a number of content to be broadcasted.

The receiving device and rebroadcast content scheduling device may be realized by using a computer. In such a case, the scope of the present invention includes a rebroadcast content scheduling program and a computer-readable recording medium storing the program, the program realizing the receiving device or the rebroadcast content scheduling device by causing the computer to operate as each of the means.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A rebroadcast content scheduling device, comprising:

a communication section receiving reception state information transmitted from a receiving device, the receiving device detecting a reception defection degree in reception of a broadcast wave and transmitting the reception state information at a given timing, where the reception state information includes content identification information for identifying content represented by the broadcast wave received by the receiving device and indicates the reception defection degree;

a summing section summing up a characteristic amount regarding the reception defection degree for every content by using the content identification information contained in the reception state information received by the communication section where the reception defection degree is indicated by the reception state information; and a content scheduling section determining, based on a result of the summing performed by the summing section, which content is to be rebroadcasted.

2. The rebroadcast content scheduling device as set forth in claim 1, wherein:

the summing section calculates out, as the characteristic amount, an average of the reception defection degree indicated by the reception state information transmitted from each of a plurality of the reception devices.

3. The rebroadcast content scheduling device as set forth in claim 1, wherein:

the summing section counts up, as the characteristic amount, reception state information that indicates a reception defection degree larger than a given value.

4. The rebroadcast content scheduling device as set forth in claim 1, comprising:

a broadcast area identification information storage section for storing therein broadcast area identification information and coverage area information in association with each other, the broadcast area identification information identifying a broadcast area and the coverage area information indicating a coverage area of the broadcast area, the communication section receiving positional information from the receiving device together with the reception state information, the positional information indicating a current position of the receiving device, the summing section (a) specifying the coverage area information that covers a position indicated by the positional information, (b) reading out, from the broadcast area identification information storage section, the broadcast area identification information that is in association with the thus specified coverage area information, and (c) summing up the characteristic amount for each content per broadcast area by using the thus read-out broadcast area identification information, and based on the result of the summing performed by the summing section, the content scheduling section determining, per broadcast area, which content is to be rebroadcasted.

5. The rebroadcast content scheduling device as set forth in claim 1, comprising:

a rebroadcast notifying section extracting, from among the reception state information received by the communication section, reception state information that includes content identification information of content that the content scheduling section determines to be rebroadcasted, and for notifying a receiving device that the content is to be rebroadcasted, the receiving device having transmitted the extracted reception state information to the rebroadcast content scheduling device.

6. The rebroadcast content scheduling device as set forth in claim 1, wherein:

the rebroadcast content scheduling device further comprises a non-transitory computer-readable medium having instructions stored thereon, such that when the instructions are read and executed by a processor, the processor is configured to function as the communication section, the summing section, and the content scheduling section.

7. A rebroadcast content scheduling system, comprising:

reception devices for receiving a broadcast wave; and a rebroadcast content scheduling device, each of the reception devices comprising:

a receiving section receiving a broadcast wave;

a detection section detecting a reception defection degree in the reception of the broadcast wave; and a reception state notifying section transmitting reception state information to a rebroadcast content scheduling device if the reception defection degree detected by the detection section is larger than a predetermined value, the rebroadcast content scheduling device being for scheduling rebroadcast content, where the reception state information includes content identification information for identifying content represented by the broadcast wave received by the receiving section and indicates that the reception defection occurred in the reception of the content, and the rebroadcast content scheduling device comprising:

a communication section receiving the reception state information from the receiving device;

a summing section counting up occurrence of reception defection for every content by using the reception state information received by the communication section and the content identification information included in the reception state information, where the reception defection is a state in which the reception defection degree in the reception device is larger than the given value; and a content scheduling section determining, based on a summing result of the summing section, which content is to be rebroadcasted.

8. The rebroadcast content scheduling system, as set forth in claim 7, wherein:

the receiving device comprises a positional information acquiring section acquiring positional information that indicates a current position, the reception state notifying means section causing the reception state information to include the positional information acquired by the positional information acquiring section, the rebroadcast content scheduling device comprises a broadcast area identification information storage section for storing therein broadcast area identification information and coverage area information in association with each other, the broadcast area identification information identifying a broadcast area and the coverage area information indicating a coverage area of the broadcast area, the summing section (a) specifying the coverage area information that covers a position indicated by the positional information, (b) reading out, from the broadcast area identification information storage section, the broadcast area identification information that is in association with the thus specified coverage area information, and (c) summing up the count of the reception defection for each content per broadcast area by using the thus read-out broadcast area identification information, and based on the result of the summing performed by the summing section, the content scheduling section determining, per broadcast area, which content is to be rebroadcasted.

9. The rebroadcast content scheduling system as set forth in claim 7, wherein:

the rebroadcast content scheduling device comprises a rebroadcast notifying section extracting, from among reception state information received by the communication section, reception state information that includes content identification information associated with content that the content scheduling section determines to be rebroadcasted, and for notifying a receiving device that the content is to be rebroadcasted, the receiving device having transmitted the extracted reception state information to the rebroadcast content scheduling device.

10. The rescheduling content scheduling system as set forth in claim 7, wherein:

the receiving device comprises:

an EPG information storage section for storing therein EPG information that indicates a broadcast time of each content; and an EPG display process section causing a display device to display the EPG information thereon, the EPG display process section matching (a) EPG information that is in association with given content indicated by the content identification information contained in the reception state information transmitted by the reception state notifying section, against (b) EPG information that is in association with the rebroadcast content, so as to judge whether or not the given content is to be rebroadcasted, and if the given content is to be rebroadcasted, the EPG display process section displaying the EPG information that is in association with the rebroadcast content corresponding to the given content in such a manner that the EPG information is displayed in a display style different from that of EPG information of the rest of the content.

11. The rebroadcast content scheduling system as set forth in claim 7, wherein:

the content scheduling section determines which content is to be rebroadcasted at a channel for exclusive use in rebroadcasting.

12. A rebroadcast content scheduling system, comprising:

reception devices for receiving a broadcast wave; and a rebroadcast content scheduling device, each of the reception devices comprising:

a receiving section receiving a broadcast wave;

a detection section detecting a reception defection degree in the reception of the broadcast wave, the reception defection degree indicating how sever reception defection is; and a reception state notifying section transmitting reception state information to a rebroadcast content scheduling device at a given timing, the rebroadcast content scheduling device being for scheduling rebroadcast content, where the reception state information includes content identification information for identifying content represented by the broadcast wave received by the receiving section and indicates the reception defection degree detected by the detection section, and the rebroadcast content scheduling device comprising:

a communication section receiving the reception state information from the receiving device;

a summing section summing up a characteristic amount for every content by using the content identification information included in the reception state information received by the communication section, the characteristic amount regarding a reception defection degree, where the reception defection degree is indicated by the reception state information, a content scheduling section determining, based on a summing result of the summing section, which content is to be rebroadcasted.

13. The rebroadcast content scheduling system, as set forth in claim 12, wherein:

the receiving device comprises a positional information acquiring section acquiring positional information that indicates a current position, the reception state notifying section causing the reception state information to include the positional information acquired by the positional information acquiring section, the rebroadcast content scheduling device comprises a broadcast area identification information storage section for storing therein broadcast area identification information and coverage area information in association with each other, the broadcast area identification information identifying a broadcast area and the coverage area information indicating a coverage area of the broadcast area, the summing section (a) specifying the coverage area information that covers a position indicated by the positional information, (b) reading out, from the broadcast area identification information storage section, the broadcast area identification information that is in association with the thus specified coverage area information, and (c) summing up the characteristic amount for each content per broadcast area by using the thus read-out broadcast area identification information, and based on the result of the summing performed by the summing section, the content scheduling section determining, per broadcast area, which content is to be rebroadcasted.

14. The rebroadcast content scheduling system as set forth in claim 12, wherein:

the rebroadcast content scheduling device comprises a rebroadcast notifying section extracting, from among reception state information received by the communication section, reception state information that includes content identification information associated with content that the content scheduling section determines to be rebroadcasted, and for notifying a receiving device that the content is to be rebroadcasted, the receiving device having transmitted the extracted reception state information to the rebroadcast content scheduling device.

15. The rebroadcast content scheduling system as set forth in claim 12, wherein:

the content scheduling section determines which content is to be rebroadcasted at a channel for exclusive use in rebroadcasting.

16. A rebroadcast content scheduling method for a rebroadcast content scheduling device, the rebroadcast content scheduling method comprising the steps of:

receiving reception state information which detects a reception defection degree in reception of a broadcast wave and which transmits the reception state information at a given timing, where the reception state information includes content identification information for identifying content represented by the received broadcast wave and indicates the reception defection degree;

summing up a characteristic amount regarding the reception defection degree for every content by using the content identification information included in the received reception state information, where the reception defection degree is indicated by the reception state information; and determining which content is to be rebroadcasted based on a result of the summing.

17. A non-transitory computer-readable medium having instructions stored thereon, said instructions are read and executed by a processor for causing the processor to perform the rebroadcast content scheduling method according to claim 16.

* * * * *